Sept. 4, 1956 C. E. LOMAX 2,761,905

FINDER ARRANGEMENTS IN TELEPHONE SYSTEMS

Filed March 27, 1953 9 Sheets-Sheet 1

INVENTOR.
CLARENCE E. LOMAX
BY Wm. Walter Owen
ATTY.

FINDER ARRANGEMENTS IN TELEPHONE SYSTEMS

Filed March 27, 1953 9 Sheets-Sheet 2

INVENTOR.
CLARENCE E. LOMAX
BY Wm. Walter Owen.
ATTY.

LINE CIRCUIT

INVENTOR.
CLARENCE E. LOMAX
BY Mc Walter Owen
ATTY.

INVENTOR.
CLARENCE E. LOMAX

BY [signature]

ATTY

FINDER ARRANGEMENTS IN TELEPHONE SYSTEMS

Filed March 27, 1953

SECONDARY FINDER (SEC'Y SUBG'RP. A)

INVENTOR.
CLARENCE E. LOMAX
BY [signature]
ATTY.

FINDER ARRANGEMENTS IN TELEPHONE SYSTEMS

Filed March 27, 1953 9 Sheets-Sheet 6

COMMON SECONDARY EQUIP'T.

INVENTOR.
CLARENCE E. LOMAX

BY [signature]

ATTY.

Sept. 4, 1956 C. E. LOMAX 2,761,905

FINDER ARRANGEMENTS IN TELEPHONE SYSTEMS

Filed March 27, 1953 9 Sheets-Sheet 7

PRIMARY ALLOTTER PA1

INVENTOR.
CLARENCE E. LOMAX
BY [signature]
ATTY.

Sept. 4, 1956 C. E. LOMAX 2,761,905

FINDER ARRANGEMENTS IN TELEPHONE SYSTEMS

Filed March 27, 1953 9 Sheets-Sheet 8

INVENTOR.
CLARENCE E. LOMAX

BY McWatters Owen

ATTY.

Sept. 4, 1956 C. E. LOMAX 2,761,905

FINDER ARRANGEMENTS IN TELEPHONE SYSTEMS

Filed March 27, 1953 9 Sheets-Sheet 9

INVENTOR.
CLARENCE E. LOMAX
BY Wm. Walter Owen.

ATTY.

United States Patent Office 2,761,905

Patented Sept. 4, 1956

2,761,905

FINDER ARRANGEMENTS IN TELEPHONE SYSTEMS

Clarence E. Lomax, Chicago, Ill., assignor to Automatic Electric Laboratories, Inc., Chicago, Ill., a corporation of Delaware Application March 27, 1953, Serial No. 344,988

32 Claims. (Cl. 179—18)

The invention relates to telephone systems and, more particularly, to the finder stage or stages in such systems.

Telephone systems using line finders are known in which secondary finders are interposed between the first numerical switches and the line finders proper. In systems of this type the secondary finders are wired to give access to line finders belonging to different line groups so that the numerical switch associated with a given secondary finder has access to subscriber lines of different groups. As the traffic peaks in different line groups are unlikely to coincide the provision of secondary finders reduces the number of numerical switches required to handle the traffic originating in these groups.

It is a primary object of the invention to provide in systems of this type simple and effective means, whereby in the case of overlapping calling conditions in different line groups served by a number of secondary finders the number of secondary finders taken into use reflects the number of calling conditions existing in these line groups.

It is another object of the invention to provide in systems of the above type in which each secondary finder has a plurality of sets of outlets, each set giving access to primary finders in one or more different line groups, a simplified arrangement for identifying the set of outlets to be used by the secondary finder in a given call.

Instead of trunking all line finders in each line group through secondary finders one may also provide in each group a limited number of line finders each of which has a numerical switch individually and directly associated therewith. Arrangements of this sort are known in which the individually trunked line finders in a given group are connected to the first portion of the contact bank of the allotter serving this group and the secondary or indirectly trunked line finders, or more generally expressed, the line finders trunked to first numerical switches common to a plurality of primary groups, are connected to the remaining portion of the allotter bank. As the allotter is arranged to return to its home position between any two allotting operations, the individually trunked line finders are taken into use in preference over the commonly trunked line finders. This avoids the busying of other groups for lack of comon trunking paths until the trunking paths individually associated with the group in question are all in use.

While arrangements of this sort are in other respects satisfactory they involve excessive wear of the directly trunked line finders; and because of the frequent homing operations of the allotter they also result in considerable wear of the allotter and in delays in the handling of calls during periods of heavy traffic.

It is, accordingly, another object of the invention to provide an arrangement for allotting individually and commonly trunked line finders which eliminates the foregoing disadvantages and at the same time prevents or minimizes the occurrence of an all-common-trunks-busy condition before all individually trunked line finders in the several line groups have been taken into use.

In this connection, another object of the invention resides in the provision of simple and efficient means, whereby the finders served by an allotter are taken into use in rotation and yet excessive wear of the allotter is avoided particularly in cases where, as outlined hereinbefore for the secondary finders stage, a group of finders is served in common by a plurality of allotters.

The invention both as to its organization and method of operation, together with other objects thereof, will best be understood by reference to the following specification taken in connection with the accompanying drawings. In these drawings:

Fig. 3 is the detailed circuit diagram of a line circuit as used in Fig. 2;

Fig. 4 is the detailed circuit diagram of a line finder, directly-trunked or indirectly-trunked, as shown in Fig. 2;

Fig. 5 is the detailed circuit diagram of a secondary finder as used in Fig. 2;

Fig. 6 is the detailed circuit diagram of certain control equipment associated in common with the secondary finders as used in Fig. 2;

Figs. 7–9 illustrate the individual circuits of one of the allotter links shown in Fig. 2. Within this group of figures:

Fig. 7 is the detailed circuit diagram of the primary allotter;

Fig. 8 is the detailed circuit diagram of the first-choice secondary allotter;

Fig. 9 is the detailed circuit diagram of the second-choice secondary allotter;

Before describing how the principles and features of the present invention may be carried out in detail, a general outline of some of these features will first be given with the aid of the trunking diagrams shown in Figs. 1 and 2 of the drawings.

Figures 1, 10:
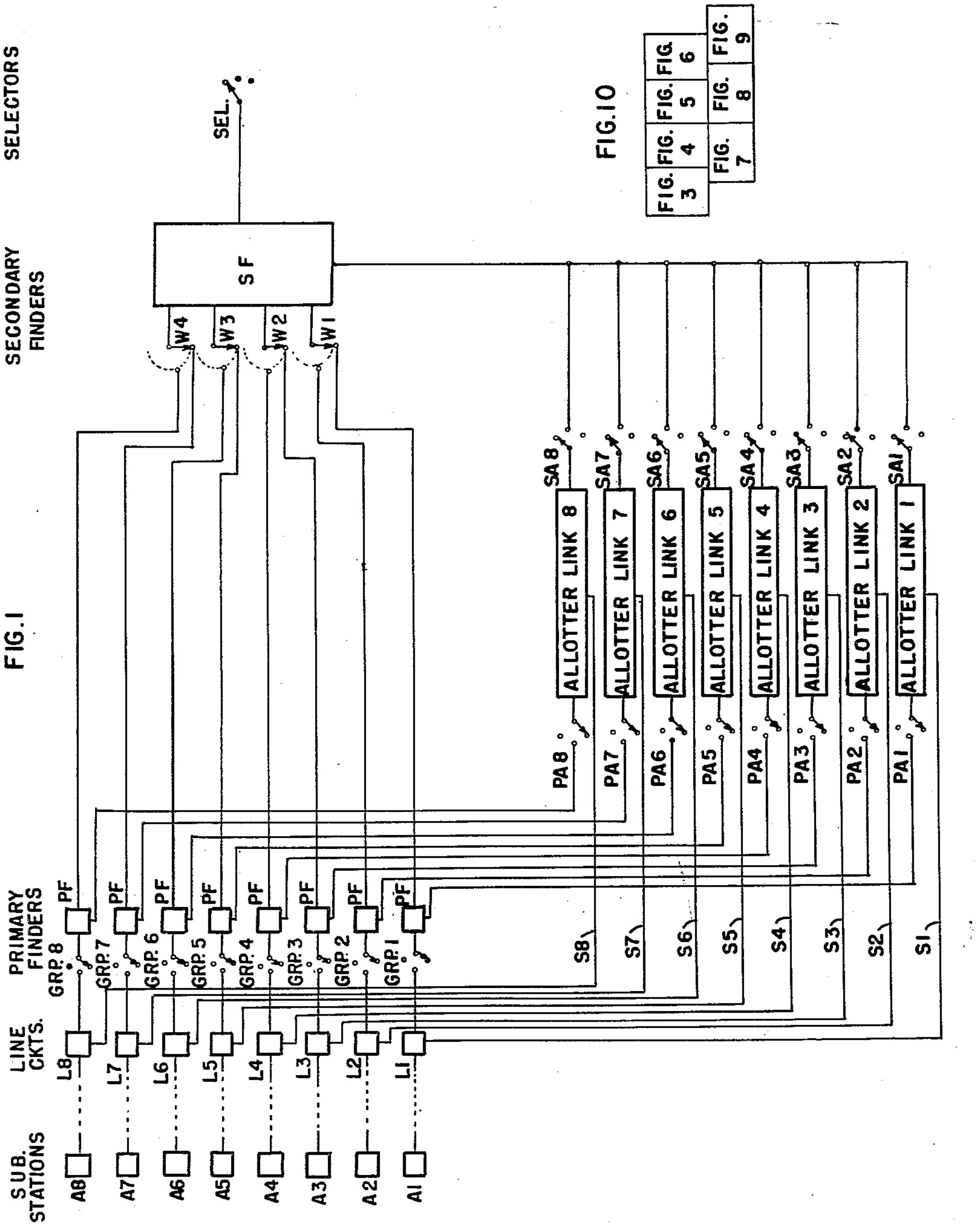
Fig. 1 is a schematic trunking diagram of the initial switching stages of a telephone system using a secondary finder arrangement in accordance with the invention.
Fig. 10 illustrates how Figs. 3–9 should be placed in relation to each other to show a unified system.

Referring first to Fig. 1, there is shown a full or major group of subscribers' stations which is divided into eight minor groups, only one substation, A1, A2, etc. being shown for each of the aforementioned minor groups. Subscribers' lines connect these substations with the associated line circuits L1 to L8 in the central office. The above-mentioned minor groups will hereinafter be simply referred to as groups or primary groups.

Corresponding to these eight groups of subscribers' lines and line circuits there are provided eight groups of primary finders PF. For purposes of example it may be assumed that each of the eight groups shown in Fig. 1 consists of 100 lines and associated substations and line circuits and the primary finders serving a given group provide access to these 100 lines over their wipers and banks. While there may, for example, be ten finders per group, only one finder PF is shown in each group. By way of example it is further assumed that these rotary finders are 25-position stepping switches, each having four sets of wipers and contact banks, not individually shown in Fig. 1, thereby providing a bank capacity of 100 lines per switch.

All eight groups of primary finders are served, in the embodiment shown in Fig. 1, by a common group of secondary finders SF, only one of these secondary finders being shown in Fig. 1. Each of these secondary finders has four "levels," i. e., sets of wipers and corresponding contact banks, W1–W4. Assuming that the finders of the secondary stage also have a 25-point arc, it will readily be seen that each level or set of banks of the secondary finders amply accommodates the trunks leading to two groups of ten primary finders each, primary groups 1 and 2 being connected to secondary level W1, primary groups 3 and 4 to secondary level W2 etc. The full group of secondary finders may for instance comprise 50 such finders SF and each of these secondary finders has associated therewith a first numerical switch which in the present case is assumed to be a selector switch such as switch SEL.

Individually associated with each of the eight primary groups is a primary allotter, these eight primary allotters being designated PA1–PA8 in Fig. 1. According to one feature of the invention each of these primary allotters has individually associated therewith a corresponding secondary allotter, all these secondary allotters SA1 to SA8 having multiple access to the full group of secondary finders. Since there are only ten primary finders in each group the primary allotters require a bank capacity of only ten contact points each although for the sake of uniformity and future growth a 25-point arc may also be used. The secondary allotters on the other hand, must give access to 50 secondary finders each and it is, therefore, assumed herein that these secondary allotters are equipped with two sets of 25-position banks each. Since there is provided one secondary allotter for each primary allotter each of these sets of primary and secondary allotters may be said to form an allotter link, the eight allotter links being shown as such in Fig. 1.

The rotary switches used herein for both finder stages and both allotter stages are assumed to be of a fast-stepping type such as disclosed, for example, in U. S. Patent 2,522,715 issued to Graybill et al. on September 19, 1950. All these switches have, in fact, double-ended wipers as shown in Figs. 3–9, and they are all of the non-homing type.

In the operation of the system when a call is originated at one of the substations, for instance substation A1 of group 1, the line relay, not shown in Fig. 1, of line circuit L1 operates to start the associated primary allotter, i. e. the primary allotter of link 1 by way of the corresponding start conductor S1 and mark the particular line as calling in the banks of the primary finders of the group in question. The primary allotters are assumed to be of the preselecting type so that the primary allotter, in the present instance, allotter PA1, is already resting on an idle primary finder PF of the associated primary group. Each group of 100 lines is divided into four subgroups of 25 lines each corresponding to the four levels of the primary finders and the line circuits of each of these four subgroups are connected with the associated allotter link by a separate start conductor so that there are four start conductors incoming to each allotter link, only one of these four conductors for each group being shown in Figure 1. Each primary allotter includes means for identifying to the primary finder taken into use thereby a particular one of the four subgroups in accordance with the start conductor over which it is started, and each of the primary finders has associated therewith a wiper selector switch, not shown in Fig. 1, which is set in accordance with this group marking before the finder is started in search of the calling line.

When a primary allotter link such as that of group No. 1 is taken into use by a line circuit such as L1, the secondary allotter such as SA1 of this allotter link also is started under the control of the primary allotter. The secondary allotters are assumed to be, basically, of the post-selecting type, that is they are arranged to test and if necessary search for an idle secondary finder only when they are actually taken into use. Provisions are made in the secondary allotters for simultaneously testing two secondary finders for their busy condition, one finder of each pair over the corresponding one of the two test wipers of the secondary allotter switch. When an idle secondary finder has been found by the secondary allotter, in the present example allotter SA1, this finder is rendered busy to the other secondary allotters and the group identity of the seizing secondary allotter transmitted to the seized secondary finder to select the corresponding level of this finder. In the present example, the secondary finder is seized by the secondary allotter of allotter link 1, that is the allotter link associated with primary group 1, and accordingly the first level W1 of this finder is selected and the secondary finder started in search of a calling primary finder connected to this level.

The primary finder and secondary finder search simultaneously and either of these two finders may find first. However, regardless of whether the primary finder finds the calling line first or whether this finder is first found by the secondary finder, arrangements are made such that the primary allotter, PA1, cannot be freed until the primary finder has found the calling line and has on its part been found by the secondary finder. Furthermore, and according to another feature of the invention when the secondary finder has completed its finding operation it causes the secondary allotter SA1 serving it to advance one step and the allotter comes to a rest in the next position thus reached regardless of whether or not the two secondary finders connected to this next position are busy and without either of these two finders being busied to the other secondary allotters. In this manner a number of secondary allotters may simultaneously rest idly on the same pair of secondary finders. If subsequently one of these allotters is taken into use in another call one of the aforementioned two finders, if idle, is seized by this allotter and this finder is rendered busy to the other allotters but these other allotters are not dislodged at that time from the position tentatively assumed by them. In this way frequent hunting of the secondary allotters as would occur if these multipled allotters were arranged to "chase each other away" is prevented; yet, because of the automatic advancement of a given secondary allotter at the completion of the searching operation of the secondary finder served by the allotter, these finders are allotted in rotation and, in particular, the repeated seizure of a faulty secondary finder by a given secondary allotter is prevented.

Reverting to the feature of the invention according to which a secondary and primary allotter are individually associated with each other it will readily be seen that with this arrangement as many secondary finders are simultaneously taken into operation as there are primary groups in calling condition—provided, of course, the number of secondary finders, 50 in the assumed example, is at least as great as the number of primary groups. It will further be appreciated that the transmission of a group identifying marking from the secondary allotter to the secondary finder is greatly simplified by virtue of the fact that each of these secondary allotters is fixedly associated with a given primary group so that all that needs to be transmitted to the secondary finder is the group identity of the secondary allotter itself.

As pointed out above each level of the secondary finders SF accommodates two groups of primary finders, level W1, for instance, giving access to primary groups 1 and 2. For this reason there is no assurance in the embodiment of the invention described herein that if there are simultaneous calls in the two groups served by the same secondary level, the secondary finder taken into use by the secondary allotter of a given one of these two groups, hereinafter briefly referred to as the "related" secondary finder, will find the started primary finder of this particular primary group. Instead it may happen that the secondary finder taken into use by the secondary allotter of the other primary group, that is a "non-related" secondary finder, finds the primary finder in the first mentioned group. In order to assure that even in this situation as many secondary finders search and keep searching for a primary finder in calling condition as there are groups calling, provisions are made so that if a primary finder has found the calling line and has itself been found by a non-related secondary finder the related secondary finder is kept in operation in an attempt to find a non-related primary finder, that is, a primary finder in another calling group. On the other hand, should the related secondary finder find a non-related primary finder before the related primary finder has found the calling line and has itself been found by a non-related secondary finder the start condition for the secondary allotter which as mentioned above is controlled by the associated primary allotter, would continue to exist in spite of the fact that the related secondary finder has already completed its finding operation and therefore advanced the secondary allotter. To guard against the possibility that, under this condition, another secondary finder is needlessly taken into use by the secondary allotter means are provided which cause the secondary allotter to be locked out of service until the start condition has been removed by the associated primary allotter.

It will be understood from what has been said above that the provision in both the primary and secondary finders of wiper selecting means which are operated in accordance with the originating start group, permits the use of rotary type switches of relatively large line or trunk capacity without increasing the hunting time required by these switches. Thus in the above example both the primary and secondary finder switches while having a capacity of 100 lines or trunks each will never be required to hunt over more than 25 switch positions in any call. Such a reduction in searching time is of particular importance in systems using a secondary finder stage in order to insure the receipt of dial tone from the first numerical switch in sufficiently short time after lifting the receiver. The double-hunting feature in the secondary allotter works in the same direction. More particularly, in the described example the secondary allotter also never searches over more than 25 positions although, due to the provision of two wiper and bank sets in this switch, it permits the accommodation of as many as 50 secondary finders in one secondary group.

Figure 2:
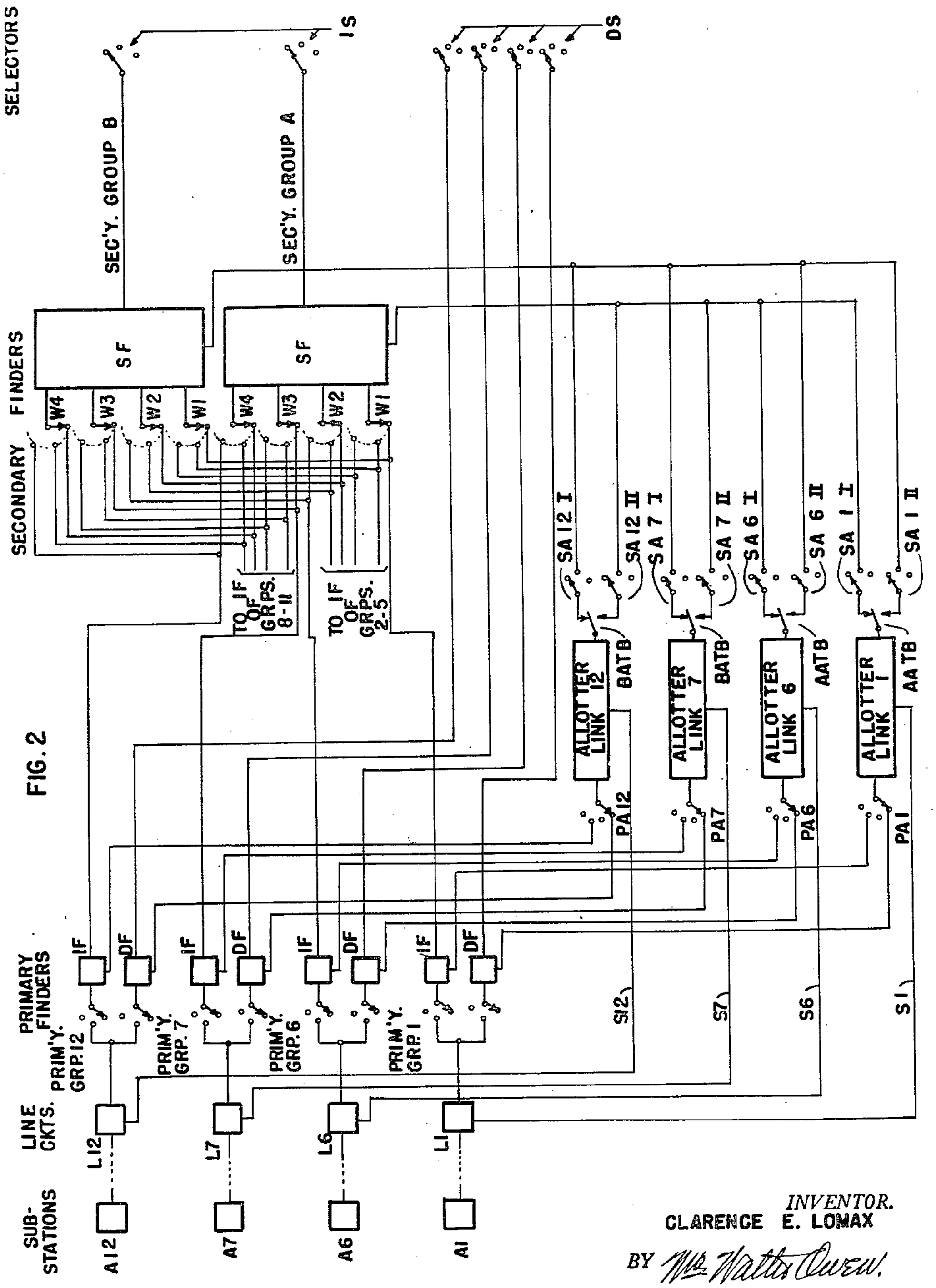
Fig. 2 is a schematic trunking diagram of the initial switching stages of a similar telephone system using a partial-secondary finder arrangement in accordance with the invention.

The embodiment of the invention shown schematically in Fig. 2 and illustrated in greater detail in Figs. 3–9 is quite similar to the embodiment according to Fig. 1 so that the features of the invention pointed out in connection with Fig. 1 apply correspondingly to the arrangement of Fig. 2. However, the arrangement according to Fig. 2 differs from that of Fig. 1 in three particulars, each corresponding to a further notable feature of the invention:

1. While in Fig. 1 all ten finders of each primary group are trunked through secondary finders there are provided in Fig. 2 two directly trunked finders DF, only one of these finders being shown per group, which are individually connected to an associated selector DS. The remaining eight line finders in each primary group are trunked through secondary finders SF, each of these secondary finders SF as in Fig. 1 being individually associated with a selector IS. The designation IS has been chosen to distinguish these indirectly trunked selectors from the directly trunked selectors DS. Only one of the eight indirect finders IF has been shown for each primary group in Fig. 2. Each primary allotter PA is arranged normally to allot the line finders of its associated group irrespective of whether the finder is of the directly or indirectly trunked type. However, provisions are made whereby when the indirect traffic has reached a certain amount, more particularly and in accordance with the embodiment described in detail hereinafter, when a predetermined number of secondary finders SF of the full secondary group illustrated in Fig. 2 are in use, for preventing or minimizing the allotting of further indirect finders by way of the primary allotters.

In this manner excessive wear of the direct finders and corresponding frequent stepping operations of the primary allotters as would occur if the direct finders were arranged to be first choice to the primary allotters at all times and the latter allotters designed to home before each of these allotting operations, are avoided; yet as soon as the indirect traffic has reached the above predetermined amount the direct finders in each group are allotted in preference over the indirect finders, whereby the occurrence of an all-busy condition in the common group of secondary finders may be delayed until the direct finders in the several primary groups have been taken into use.

2. As, in the embodiment according to Fig. 2, there are only eight secondary-trunked line finders for each primary group, three such groups of primary finders can be accommodated in each level of the secondary finders, assuming again that the secondary finders have a 25-point arc each. Since each secondary finder again has four levels a total of twelve primary groups can be served by the secondary finders. These twelve primary groups are correspondingly indicated in Fig. 2 together with the four respective allotter links 1–12 and the associated start conductors S1–S12.

3. Corresponding to the greater number of primary groups that are to be served by the secondary finders a greater number of these secondary finders will be required. More particularly it is assumed in Fig. 2 that the group of secondary finders comprises a total of 100 finders divided into two component groups, A and B, of 50 secondary finders each, only one finder in each of these two groups being shown in Fig. 2. The banks of the secondary finders of both component groups are multiplied together, contact by contact, so that all 100 finders have access to all indirectly trunked line finders in each of the twelve primary groups. These 100 secondary finders are allotted by a pair of secondary allotters per allotter link, one of these allotters being used as a first choice allotter and the other as a second choice allotter. For example, taking the case of allotter link 1 it will be seen that the first choice allotter SA1I of this allotter link has access to the 50 secondary finders of component group A and the second choice allotter SA1II of this allotter link has access to the 50 secondary finders of component group B. More generally speaking it will be clear from Fig. 2 that the first choice allotters of links 1–6 give access to the secondary finders of component group A and the second choice allotters of these links to the secondary finders of component group B. In allotter links 7–12 this relation is reversed, that is the first choice secondary allotters of links 7–12 give access to the B finders and the second choice secondary allotters of these links give access to the A finders.

When all secondary finders of component group A are busy, transfer means indicated in Fig. 2 by break-make contact AATB effect a transfer from the first choice to the second choice secondary allotters in each of links 1–6; and similar transfer means BATB associated with allotters 7–12 become effective when all finders of component group B are busy to bring about a transfer from the first choice to the second choice secondary allotters in each of these last-mentioned six links. In this manner, although each allotter link is given access to a total of 100 secondary finders, only an allotter switch of one half this capacity is started at any given time; and since each of these allotters is of the double-hunting type as described in connection with Fig. 1, none of the secondary allotter switches needs to search over more than 25 positions on any single call. Due to the above mentioned reversal of the secondary allotter connections as between allotter links 1–6 and 7–12 the originating traffic is substantially evenly distributed between the secondary finders of group A and group B.

CALL THROUGH A DIRECT LINE FINDER

Referring to Figs. 4–9, a detailed description will now be given of an embodiment of the invention employing the trunking layout shown in Fig. 2.

Figure 3:
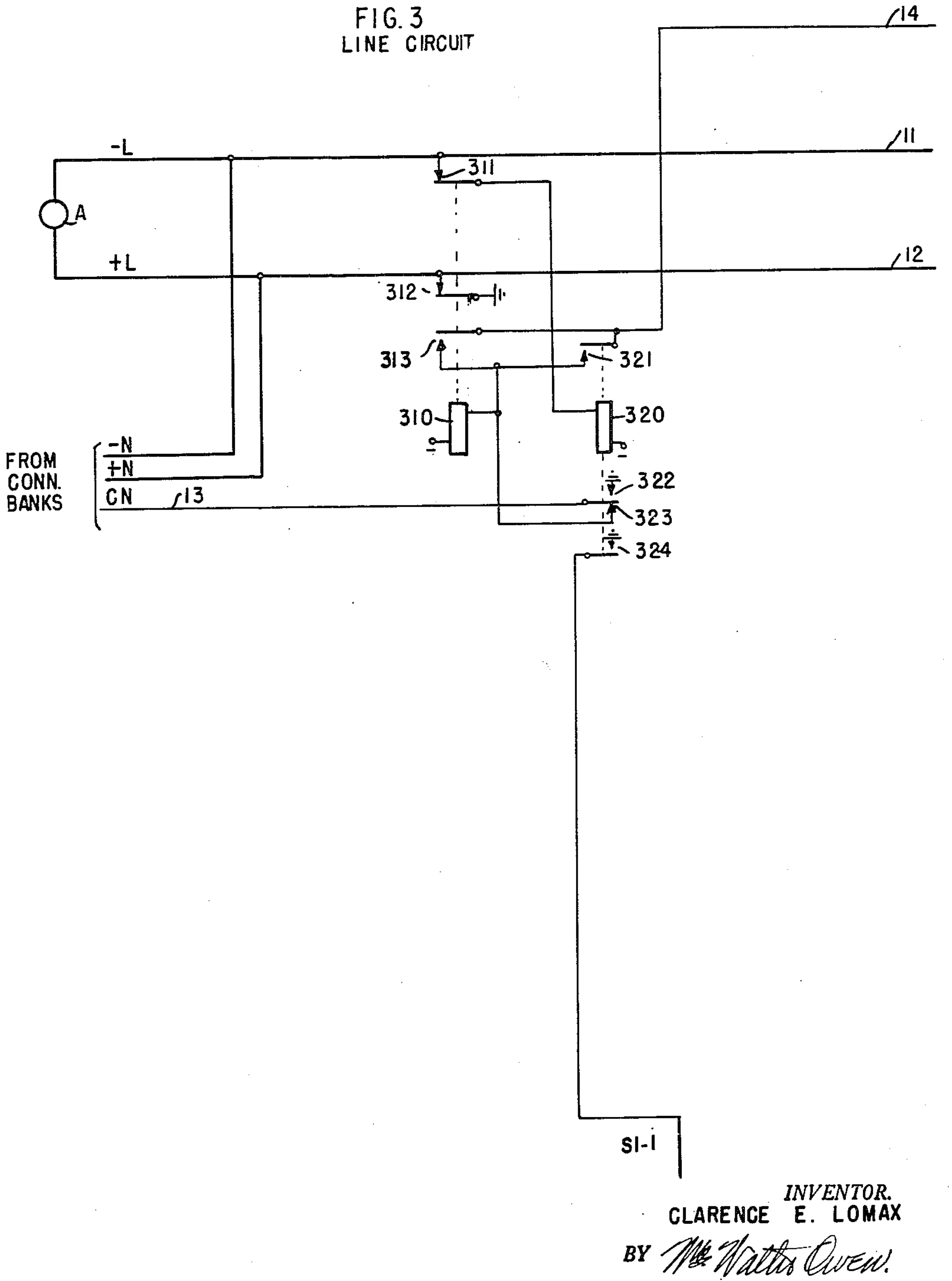
Figs. 3–9 illustrate the individual circuits involved in the arrangement according to Fig. 2 in detail. More particularly.

Let it be assumed that the line circuit shown in Fig. 3 is associated with a subscriber's line in subgroup 1 of primary group 1. All line circuits in this subgroup have a common start conductor S1–1 and are all connected to the first level of the line finders of group 1, one of these finders being shown in Fig. 4.

Figure 4:
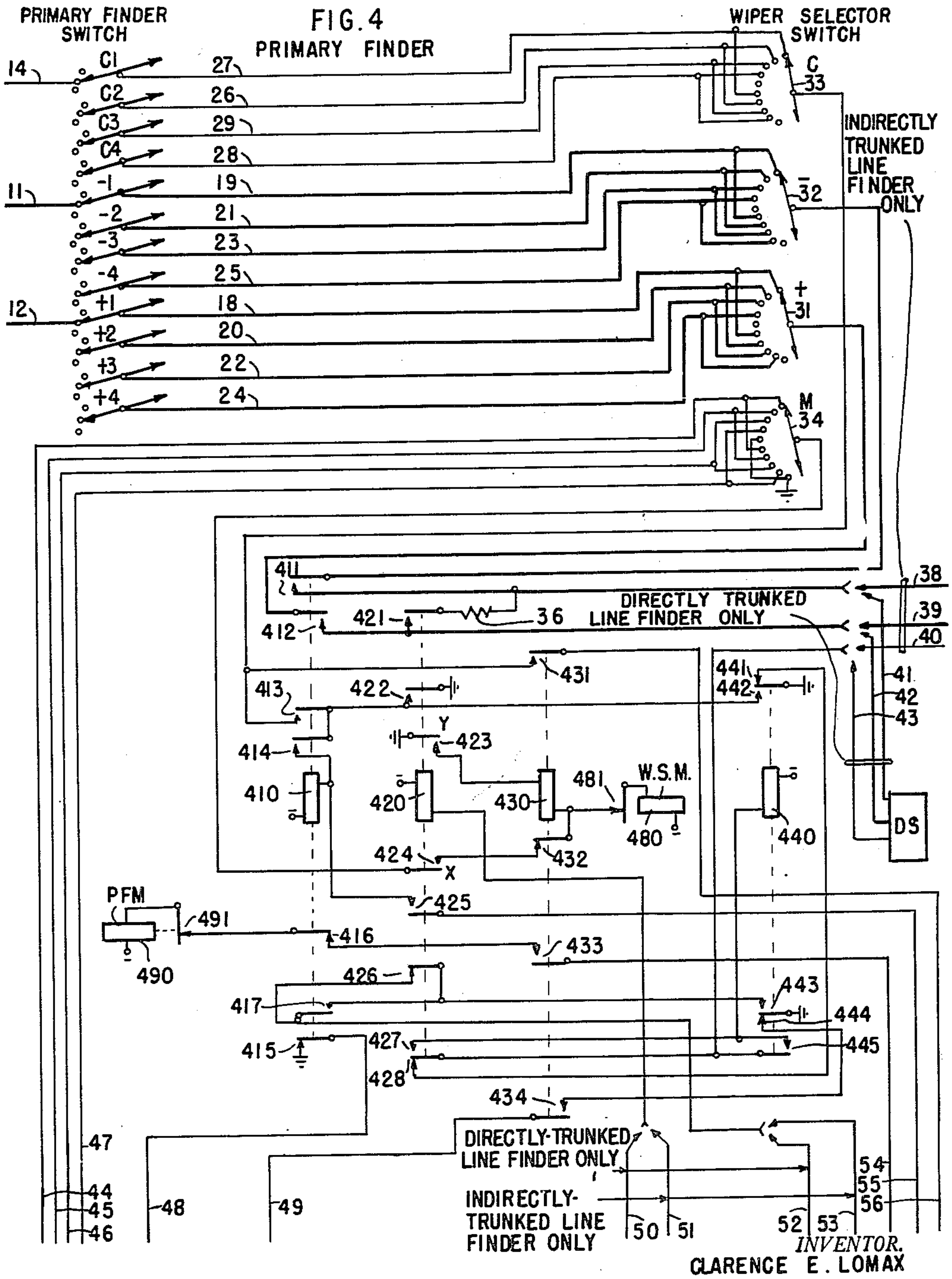
Figure 7:
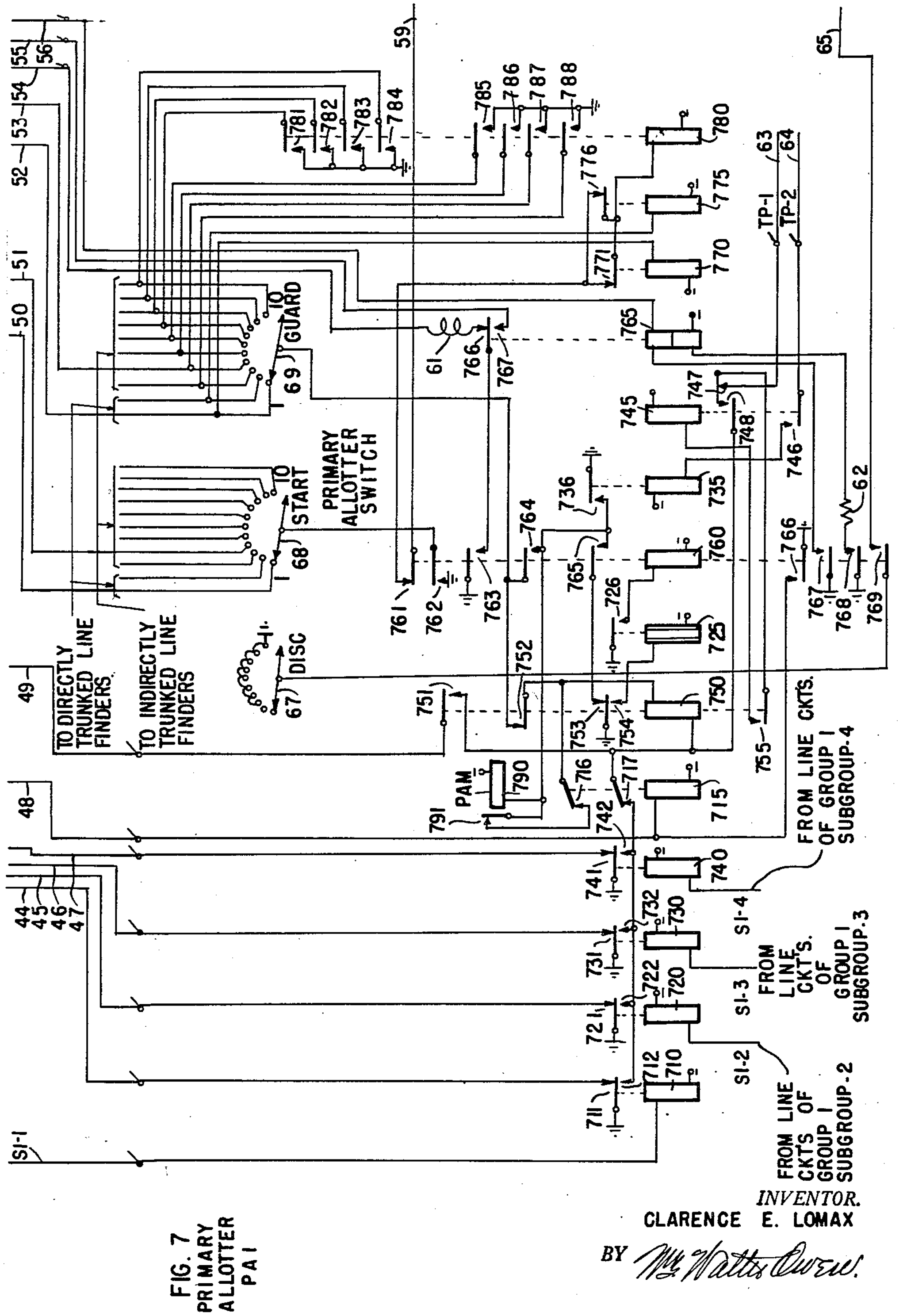

It will further be assumed that the primary allotter PA1 of group 1 which is illustrated in Fig. 7 of the drawings and which corresponds to primary allotter PA1 in Fig. 2 has preselected and is therefore resting on the primary finder, Fig. 4; and for the purposes of the present section it will also be assumed that this line finder is a directly trunked finder and that it is connected to the first set of contacts in the banks of the primary allotter switch. As the primary finder is assumed to be a directly trunked finder it has individually associated therewith a first selector DS which is schematically indicated in Fig. 4. Also shown in Fig. 4 is the wiper selector switch which is associated with the primary finder.

When the subscriber at substation A, Fig. 3, lifts his receiver to initiate a call the calling loop is completed to line relay 320 by way of the following circuit: ground, contact 312 of cut-off relay 310, positive line conductor 12, substation A, negative line conductor 11, contact 311 of cut-off relay 310, winding of line relay 320, battery. Relay 320 in operating at its contact 324 grounds the above-mentioned start conductor S1–1, at 322 closes ground to CN conductor 13 to render the line circuit busy to incoming calls and at contact 321 connects battery through the winding of cut-off relay 310 to conductor 14, thereby to mark the line as calling in the C1 bank of the primary finders.

In the primary allotter Fig. 7 there are provided four relays 710 to 740, each of these relays serving as the start relay for the associated one of the four subgroups of primary group 1 which is served by allotter PA1. When group is connected to start conductor S1–1 as just described relay 710 operates in an obvious circuit extending over this conductor. Relay 710 in operating at contact 711 removes ground from conductor 44, thereby to mark the first and sixth contacts in the M bank of the wiper selector switch, Fig. 4, by absence of ground; and at contact 712 causes the operation of relay 750 in the following circuit: ground, contacts 712 and 717, winding of relay 750, contacts 716 and 791, winding of stepping magnet 790 of the primary allotter switch, battery. Relay 750 the winding of which has a high resistance compared with the winding of stepping magnet 790, operates in this circuit while magnet 790 does not. In operating relay 750 at its contact 751 closes a locking circuit for itself which extends through conductor 49 and contacts 434 and 444 to ground; and at contact 754 causes the operation of slow-to-release relay 725 over an obvious circuit. The last-mentioned relay at its contact 726 operates relay 760, likewise in an obvious circuit.

When relay 760 operates it closes a circuit to start relay 420 of the allotted line finder, Fig. 4, which may be traced from ground through contact 762 of relay 760, start wiper 68 of allotter switch PA1 in position 1, conductor 50, winding of relay 420, to battery; at contact 763 relay 760 prepares a stepping circuit for the primary finder; at contact 766 the relay closes a locking circuit to all-trunks-busy relay 715 to prevent the release of this relay as long as the primary allotter is in use; at contact 767, relay 760 prepares a finder test circuit extending through the upper winding of common finder test relay 765; and at contact 768 relay 760 closes a pre-energizing circuit for test relay 765 extending through resistance 62 and the lower winding of the last-mentioned relay to battery, this pre-energization causing relay 765 to operate upon completion of the aforementioned finder test circuit as fast as possible. Contact 769 serves to close start ground to secondary start conductor 65 in case the primary allotter rests on one of the secondary-trunked line finders which are connected to allotter positions 3–10. In the present instance it was assumed that the allotted line finder is the directly trunked finder connected to the first position of the allotter switch. As the ground strapping on discriminating bank 67 of the allotter switch is such as to leave positions 1 and 2 corresponding to the two directly trunked line finders free from ground the closure of contact 769 has no effect in the present case.

As shown in Fig. 4 the wiper selector switch associated with the primary finder has a stepping magnet 480 and four sets of wipers, 31–34, and associated contact banks. Wiper 31 serves to connect up the selected one of the four positive line wipers, 18, 20, 22 or 24 of the line finder; wiper 32 serves to connect up the selected one of the four negative line wipers, 19, 21, 23 or 25, of the line finder; wiper 33 serves to connect up the selected one of the four test wipers, 27, 26, 29 or 28 of the line finder; and wiper 34, in conjunction with magnet 480 and wiper selector test relay 430, serves to position the wiper selector switch on the first encountered of the four marking conductors, 44, 45, 46, 47 from which ground has been removed in the primary allotter. As will be noted from Fig. 4 the wiper selector switch has been assumed to be a 10-position rotary switch and since only four sets of finder wipers have to be selected the appearances in positions 1–4 of the banks of the wiper selector switch have been repeated in positions 6–9 of these banks. Contacts 5 and 10 of the marking bank are shown grounded to cause the switch automatically to step over these two unused positions.

When finder start relay 420 operates as mentioned above it closes its preliminary contact 424, marked "x," to connect the marking wiper, 34, of the wiper selector switch, to the junction point between the winding of relay 430 and the interrupter contact, 481, of magnet 480. Thereafter, it closes, at its contact 421, a temporary loop circuit extending over resistance 36 and line conductors 41 and 42 to the line relay, not shown, of the associated selector DS; at contact 425 the relay closes a point in the circuit for switching relay 420; at contact 427 it connects the winding of relay 440 to test conductor 43 of selector DS; and at contact 423, marked "Y," it finally closes a circuit extending from ground through the winding of wiper selector test relay 430, interrupter contact 481, stepping magnet 480 to battery.

The wiper selector switch is shown in Fig. 4 as resting on the first set of its bank contacts corresponding to subgroup 1. As this is the calling subgroup in the instant example, ground is removed from marking conductor 44 connected to the first contact in the marking bank of this switch and hence there is no short circuit for wiper selector test relay 430 by way of contacts 424 and 432. As a result this relay operates in series with wiper selector stepping magnet 480 in the circuit traced above. As the winding of relay 430 is of relatively high resistance as compared with that of magnet 480 the last-mentioned magnet does not operate in this circuit. Relay 430 upon operating at its contact 432 opens the connection between marking wiper 34 and magnet 480 so that any stepping operation of this magnet is prevented; at 431 the relay closes a point in the test circuit extending over conductor 56 for the line finder switch; at 433 it completes a circuit for stepping magnet 490 of the finder switch which circuit will be traced below; and at 434 relay 430 closes another point in the above-mentioned holding circuit extending over conductor 49 for relay 750 in the primary allotter.

When the above-mentioned preliminary loop circuit for the line relay of selector DS is closed at contact 421 of relay 420 the selector line relay operates the associated selector hold relay, also not shown in Fig. 4, and this relay, in turn, closes ground to the selector test or hold conductor 43 so as to hold the line finder from the selector when the primary allotter later releases at the end of the finding operation. For corresponding disclosure reference is made, for example, to United States Patent 2,214,908 which issued to C. E. Lomax on September 17, 1940. Relay 440 accordingly operates in the following circuit: ground on conductor 43, contact 427, winding of relay 440, battery. Relay 440 in operating at its contact 445 locks to conductor 43 independently of contact 427 and at contact 444 disconnects ground from conductor 49, thereby opening the holding circuit for relay 750 or preventing this circuit from being closed in the first place, as the case may be. In this connection it may be mentioned that relay 440 serves the function of a cut-off relay when the primary finder is used in conjunction with a secondary finder to signal the finding of the primary finder by a secondary finder to the primary allotter as explained in greater detail hereinafter. For the sake of interchangeability of line finders this relay has also been provided in the line finders which are individually connected with a selector such as selector DS.

Reverting now to the stepping circuit for the line finder which, as mentioned above, was closed at contact 433 upon the operation of wiper selector test relay 430, this circuit may be traced as follows: ground, contact 763 and 766, inductance 61, conductor 54, contacts 433, 416 and 491, winding of finder stepping magnet 490, battery. In connection with inductance 61 it should be borne in mind that as pointed out above the rotary switches used herein for both finder stages and both allotter stages are assumed to be very fast stepping switches. The fast stepping properties of this type of switch can be fully taken advantage of in those applications of the switch in which absence-of-ground searching is used, such as in all the allotters as well as the secondary finders described hereinafter in connection with the present embodiment. In contrast thereto, the primary finder shown in Fig. 4 is of the battery searching type and this involves the operation of a test relay, in the instant case common test relay 765 in the primary allotter, Fig. 7, before the switch can be stopped. Moreover, the operation of this test relay is, of necessity, slightly delayed due to the impedance of the line cut off relay which is included in its circuit. For this reason inductance 61 which, being a part of the primary allotter, is common to all line finders, is provided in series with the finder magnet to slightly reduce the stepping speed of whatever line finder may be connected to the primary allotter at a given time.

In Fig. 4 the calling line circuit is shown connected to the second position in the banks of the line finder switch so that no battery is encountered by test wiper C1 of this switch in the first position in which this switch is shown resting in Fig. 4. As a result the circuit for common test relay 765 cannot be completed at this time but stepping magnet 490 is allowed to operate in the above-traced stepping circuit so that this magnet actuates its interrupter contact 491 and thereby re-opens its energizing circuit. Upon the release of magnet 490 the finder switch is stepped to the second set of contacts in its bank where the following test circuit is closed for relays 765 and 310 in series: ground, contact 767, upper winding of relay 765, conductor 56, contact 431, C wiper 33 of the wiper selector switch, C1-wiper 27 of the finder switch, conductor 14, contact 321, winding of relay 310, battery.

Both relays 765 and 310 operate in this circuit. Relay 765, in operating, at its contact 766 opens the stepping circuit of the line finder switch, thereby preventing the re-operation of stepping magnet 490 incident to the closure of interrupter contact 491. At contact 767 the following circuit is closed for finder switching relay 410: ground, contacts 763 and 767, conductor 55, contact 425, winding of relay 410, battery. Switching relay 410, upon operating, at 411 and 412 switches the calling substation through to selector DS by way of the following loop circuit, dial tone now being returned to the calling party over this loop in a well known manner: substation A, line conductors 11, 12, negative finder wiper 19 and positive finder wiper 18, both in position 2, negative wiper selector wiper 32 and positive wiper selector wiper 31, both in position 1, contacts 411 and 412, line conductors 41 and 42 and from there through the two windings of the selector line relay, not shown, to battery and ground respectively. At contact 414 switching relay 410 locks to ground at contact 422 and a multiple ground at contact 442; at 413 relay 410 connects ground from contacts 422 and 442 to the C-wiper, 33, of the wiper selector switch, thereby to close a locking circuit for line cut-off relay 310 independently of the primary allotter; at 416 relay 410 opens another point in the circuit of finder stepping magnet 490; and at 417 the relay completes the following circuit extending over guard conductor 52 to stepping magnet 790 of the primary allotter switch: ground, contacts 443, 417, conductor 52, guard wiper 69 of the primary allotter in position 1, contact 764, winding of magnet 790, battery. Over a part of this circuit and contacts 791 and 716 the aforementioned connection of ground to guard conductor 52 also serves to short circuit the winding of relay 750.

Magnet 790 is energized in the circuit just traced and upon operating opens its interrupter contact 791, thus disconnecting battery from the right-hand terminal of relay 750. The last-mentioned relay releases, thereby preparing at its contact 752 another connection extending through contact 716 from guard wiper 69 to allotter stepping magnet 790; at contact 753 relay 750 closes a multiple circuit extending through contact 765 to the winding of this magnet; and at contact 754 it opens the circuit of relay 725. Relay 725 restores with a slight delay, in turn causing the release of relay 760. The last-mentioned relay upon releasing opens the circuit of finder start relay 420 at contact 762; at 763 opens another point in the circuit of finder stepping magnet 490; at contacts 764 and 765 opens the two aforementioned circuits for allotter switch magnet 790; at 766 opens the locking circuit to all-trunks-busy relay 715; and at 767 and 768 it disconnects ground from both windings of test relay 765, thereby to permit this last-mentioned relay to release.

Finder start relay 420, in releasing upon its circuit being opened at 762, opens the above-mentioned preliminary loop circuit for the selector line relay at contact 421, this latter relay now being held in the above-traced loop circuit extending over the subscriber's line; at 422 the relay removes one of the two multiple grounds from wiper selector wiper 33; at 423 it opens the circuit of wiper selector test relay 430 which is accordingly permitted to restore; at 424 relay 420 opens the wiper selector test circuit and at 425 the original operating circuit for switching relay 410; and at 426 relay 420 maintains ground on the guard conductor independently of contact 417 for reasons explained later in this specification. It will be understood that after the release of start relay 420 only relays 440 and 410 are in operated condition in the line finder, Fig. 4, with relay 440 being held under the control of the selector and relay 410 in turn held under the control of relay 440.

Reverting to the release of relay 760 in the primary allotter and the consequent deenergization of allotter switch magnet 790, the last-mentioned stepping magnet releases incident to this deenergization, re-closing its contact 791 and causing the allotter switch to move its wipers into position 2 and reclose its interrupter contact 791. Assuming that the other directly-trunked line finder which is connected to position 2 of the primary allotter is busy, the guard conductor of this finder will also be grounded and as a result the following new circuit will be closed to allotter magnet 790: ground encountered by guard wiper 69, contacts 752 and 716, interrupter contact 791, magnet 790, battery. Magnet 790 in operating in this circuit opens contact 791, thereby interrupting its energizing circuit. Upon releasing, magnet 790 advances the allotter switch to position 3 to which the first indirectly-trunked line finder is connected, and re-closes interrupter contact 791. In this manner, the primary allotter switch successively tests the finders connected to its bank, irrespective of whether they are directly or indirectly trunked finders, for their busy condition and the stepping action of the switch continues until an idle line finder of either type is found. If an idle finder is found, ground will no longer be encountered by guard wiper 69 so that magnet 790 cannot re-operate upon re-closure of interrupter contact 791 and the switch is stopped in the position reached.

It will be recalled that cut-off relay 310 operated incident to the finding of the line finder, Fig. 4. Relay 310 in operating disconnects line relay 320 at contacts 311 and 312; and at contact 313 closes a locking circuit for itself independent of line relay contact 321. Line relay 320 in releasing transfers CN-conductor 13 from ground at contact 322 to ground on conductor 14 by way of contacts 323 and 313; and at 324 disconnects ground from start conductor S1–1. Relay 710 consequently releases provided that no other calls are waiting in subgroup 1. Assuming further that no other calls are waiting for service in any of the other subgroups 2–4, none of relays 720, 730 or 740 is operated so that upon the opening of contact 712 ground is removed from the left-hand terminal of relay 750. The primary allotter switch would therefore, be left resting idly on the idle finder which it has preselected as described in the preceding paragraph.

On the other hand, should one or more other calls be waiting in any of the four subgroups, ground would be maintained on the left hand terminal of relay 750 by any of contacts 712, 722, 732 or 742, and accordingly relay 750 would re-operate in series with the winding of magnet 790 as soon as an idle finder, that is a finder having no ground connected to its guard conductor, has been found. As long as ground is encountered by guard wiper 69 relay 750 is prevented from re-operating due to this ground extending by way of contact 752 to the right-hand terminal of its winding, thereby short circuiting this winding.

Reverting again to the connection extending from substation A through the line finder, Fig. 4, to selector switch DS, the further setting up of this connection by way of the last mentioned switch and succeeding numerical switches including a connector switch, not shown, to a called subscriber's line, may now take place in a manner well known in the art, reference again being made to the aforementioned Lomax Patent 2,214,908. After the called subscriber, upon being signalled from the connector, has answered the call the two parties may enter into conversation. At the end of the conversation when the calling party replaces his receiver, the line and hold relays in selector DS release and ground is accordingly disconnected from conductor 43 so that relays 440, 410 in the line finder and relay 310 in the line circuit restore and the relay equipment shown in Figs. 3 and 4 is thereby returned to its normal condition. The finder switch itself and also its associated wiper selector switch remain in the position in which these switches happen to be at the end of any given call.

In the example described above it was assumed that the call originated in a substation, such as station A, belonging to subgroup 1. If a call is originated in another of the subgroups, say subgroup 3, instead, start relay 730 operates instead of relay 710 so that at contact 731 ground is removed from marking conductor 46 instead of conductor 44. Accordingly, ground encountered by wiper 34 of the wiper selector switch in position 1 will prevent relay 430 from operating immediately upon operation of finder start relay 420 and will cause wiper selector switch magnet 480 to be operated by way of contacts 424, 432 and 481. Magnet 480 attracts its armature, thereby opening its interrupter contact 481. Upon its deenergization magnet 480 causes the wiper selector switch to advance to position 2 and also closes its interrupter contact 481. Since ground is present on marking conductor 45 which is connected to position 2 of this switch, magnet 480 again operates and releases to advance the wipers of the switch to position 3. In this position ground is no longer encountered by wiper 34 and as a consequence relay 430 is permitted to operate in series with magnet 480, whereby renewed operation of magnet 480 is prevented at contact 432. After the wiper selector switch has thus been set in accordance with the subgroup calling, the further operation of the line finder takes place in the manner explained above.

CALL THROUGH INDIRECT PRIMARY FINDER AND SECONDARY FINDER

In the example described in the preceding section it was assumed that one of the directly trunked line finders 1 and 2 was idle. Let it now be assumed that at the time the allotter is released after serving a line finder, say the first directly-trunked finder, the second direct line finder also is busy and that the allotter switch, Fig. 7, accordingly has preselected the first idle one of the indirectly-trunked line finders, e. g. the finder accessible to the allotter switch in its fourth positon. Assuming then, for the purposes of the present section, that the line finder shown in Fig. 4 is this indirectly trunked line finder, it will be seen from an inspection of Figs. 4 and 7 that this finder is connected to the allotter start and guard banks by way of conductors 51 and 53 respectively; and that this finder in the present case has no selector individually associated with it but is accessible over the banks of the secondary finders, Fig. 5, by way of line conductors 38, 39 and test conductor 40.

The operation of the primary allotter, the operation of the wiper selector switch and the line-searching operation of the finder switch, Fig. 4, incident to the origination of a call at substation A are the same as described in the preceding section except for the function of relay 440 in the finder and discriminating wiper 67 in the primary allotter. As to relay 440 it will be understood that this relay in the line finder cannot operate until ground is connected to test conductor 40 incident to a secondary finder finding the primary finder, Fig. 4 as described in more detail hereinafter; and with regard to discriminating wiper 67 it will be clear that with the primary allotter switch resting in its fourth position ground is connected to the armature spring of contact 769 so that secondary start conductor 65 will be ground upon the operation of relay 760. Because of the strapping of the discriminating bank, this ground connection would be effected also if the allotter switch were resting on any of the other seven indirectly trunked line finders.

Figure 5:
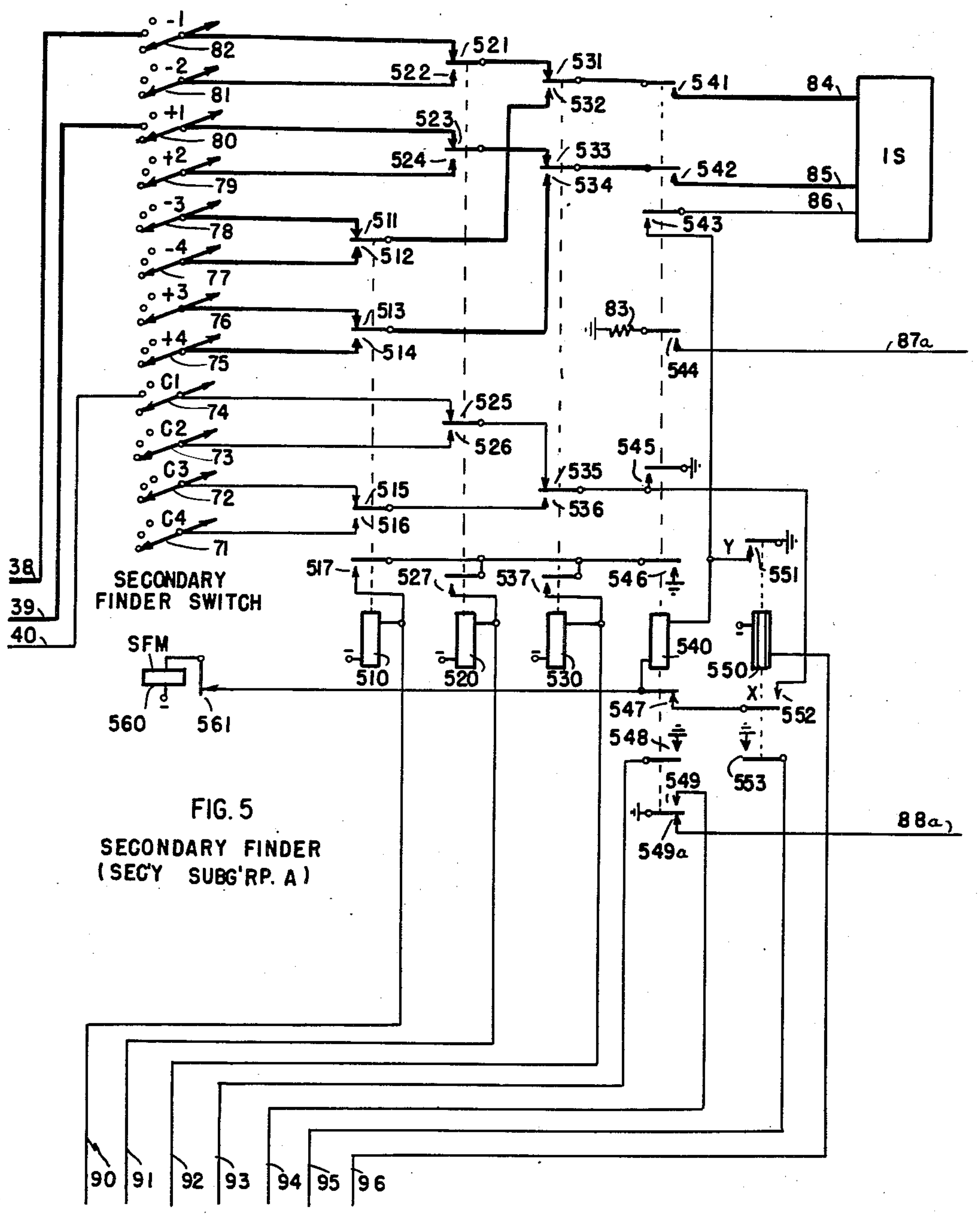

It is assumed that the particular secondary finder illustrated in Figure 5 belongs to secondary component group A as shown in Fig. 2, this secondary finder having a selector IS associated with it. As mentioned above, each of the secondary finders has four sets of wipers and banks, the first of these wiper sets being normally connected up through contacts of relays 510, 520 and 530. As described in greater detail hereinafter, a given one of the remaining three wiper sets can be made effective by operation, over conductors 90—92, of relays 510—530 in a corresponding combination.

Figure 8:
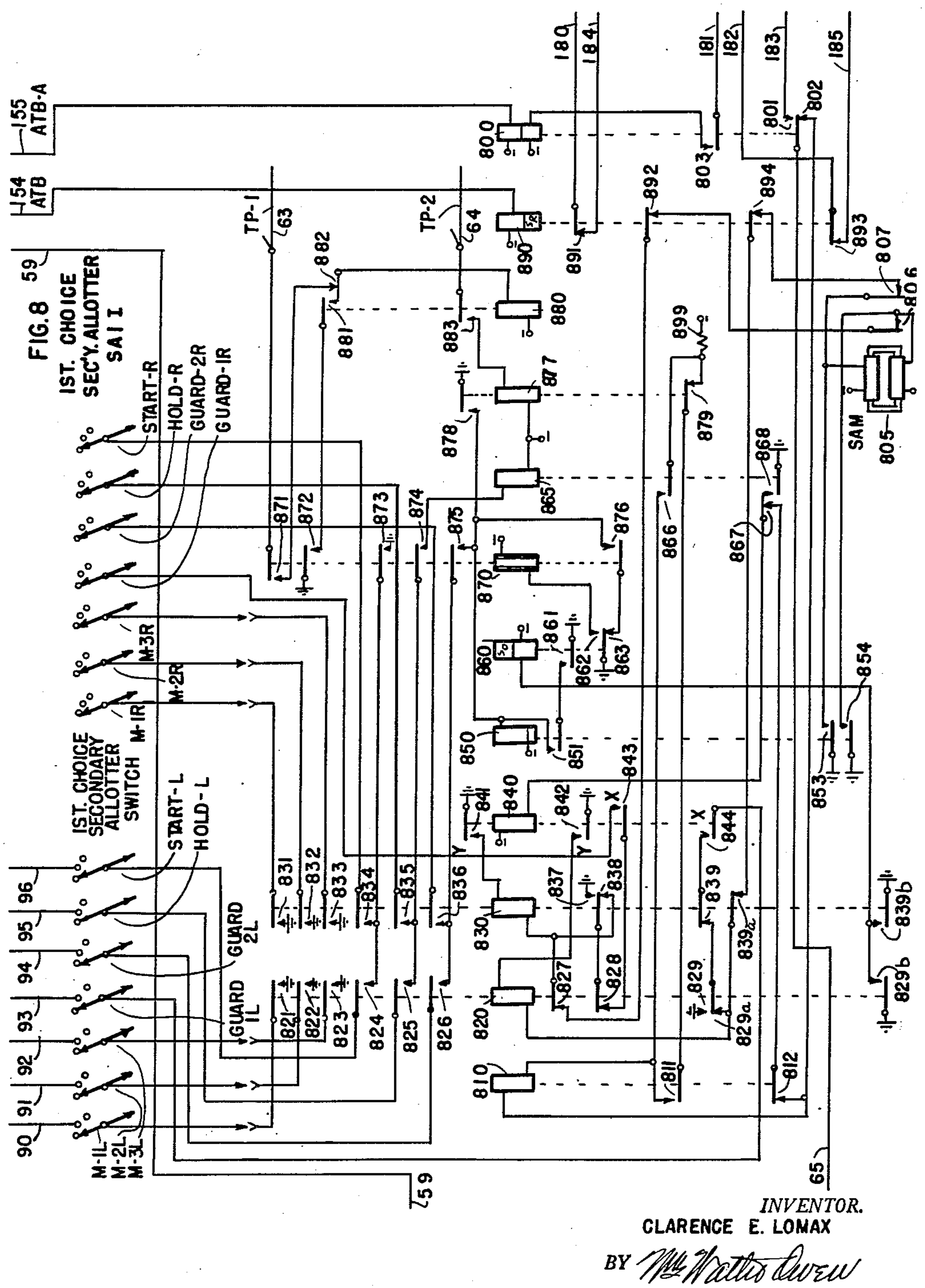

Fig. 8 shows the first choice secondary allotter, SA1I, associated with the first allotter link in accordance with Fig. 2. Secondary allotter SA1I, like all the other secondary allotters, has two sets of wipers and banks which in Fig. 8 are respectively shown on the left and right hand side of the drawing and are designated accordingly. It is assumed that the particular secondary finder shown in Fig. 5 is connected by way of conductors 90—96 to the second position in the left hand bank of the first choice allotters of allotter links 1–6 and the left hand bank of the second choice allotters linkes 7–12 in accordance with the general arrangement explained in connection with Fig. 2. The secondary allotter is arranged to test for an idle secondary finder by means of its test wiper guard 1L and guard 1R with which switching relays 820 and 830 are respectively associated. Each secondary allotter has a stepping magnet SAM which, according to one feature of the invention, is of the shunt field type and has two windings. More particularly this stepping magnet has a core forming a closed magnetic circuit and this core has two legs, of which one carries one of the two windings of the magnet while the other leg carries the other winding as indicated in Fig. 8. If only one of the two windings is energized, a magnetic flux is set up in the magnet core which follows the circular or shunt path provided by the core itself, and accordingly the armature of the magnet which is disposed opposite the right hand end of the core as seen in Fig. 8 but is not specifically shown in this figure, is not attracted. However, if both windings of magnet SAM are energized in a sense such that a pole of the same magnetic polarity is set up at the same end, say the right hand end, of both legs, then the armature is attracted. A magnetic structure of the general type just described is disclosed in U. S. Patent 1,544,300, issued June 30, 1925, to C. J. Erickson, for a relay.

It will be seen from an inspection of Fig. 8 that the upper winding of shunt field magnet SAM, designated 809 in this figure, is associated with the left hand test wiper guard 1L and switching relay 820 while the lower winding of magnet 805 is associated with test wiper guard 1R and switching relay 830. As will be explained in greater detail hereinbelow the arrangement is such that if only the secondary finder tested over wiper guard 1L is busy, switching relay 830 operates to make the right hand wiper set effective, and if only the secondary finder tested by wiper guard 1R is busy, switching relay 820 operates to make the left hand wiper set effective with shunt field magnet 805 operating in neither case; and that if both of these secondary finders are busy neither of these two switching relays operates but both windings of shunt field magnet 805 are fully energized to cause this magnet to attract its armature and advance the allotter switch to its next position.

Proceeding now wih the description of the apparatus in a call involving an indirectly-trunked line finder, it will be noted that upon closure of contact 769 incident to the operation of relay 760, Fig. 7, the following circuit is closed for relay 840: ground, discriminating bank of allotter PA1, Fig. 7, wiper 67, contact 769, secondary start conductor 65, contacts 802, 812, and 867, winding of relay 840, battery. Relay 840 upon operating at its preliminary contact 844 connects the guard 1L wiper by way of contacts 839 and **829*a* to the left hand terminal of relay 820 and further by way of contacts 839*a*, 894 and interrupter contact 807 to the upper winding of shunt field magnet 805; and at preliminary contact 843 connects the guard 1R wiper by way of contacts 828 and 838 to the left hand terminal of relay 830 and further by way of contacts 827 and 892 and interrupter contact 806 to the lower winding of magnet 805. Upon the completion of its armature stroke, relay 840 then connects ground at 842 and 841 to the right hand terminals of switching relays 820 and 830, respectively. Assuming that both secondary finders accessible over the first position of allotter SA1I are busy so that both guard wipers encounter guarding ground in position 1, both relays 820 and 830 are short circuited by the guarding ground received over the two guard wipers respectively and the two windings of shunt-field magnet 805 are fully energized over two circuits which may respectively be traced as follows: ground encountered by wiper guard 1L, contacts 844, 839, 829*a*, 839*a*, 894 and 807, upper winding of magnet 805, battery; and ground encountered by wiper guard 1R, contacts 843, 828, 838, 827, 892, 806, lower winding of magnet 805, battery. Due to the full energization of both its windings, magnet 805 attracts its armature as explained above. Accordingly interrupter contacts 806, 807 interrupt the aforementioned two energizing circuits thereby causing the release of magnet 805. As a result allotter switch SA1I is advanced to its position 2 and contacts 806 and 807** are re-closed.

Assuming that the secondary finder, Fig. 5, connected to the second set of bank contacts engaged by the left hand wiper set of secondary allotter SA1I is idle, guard conductor 93 reached by wiper guard 1L is free of ground and hence switching relay 820 is permitted to operate in series with the top winding of shunt field magnet 805 in the following circuit: ground, contact 842, winding of relay 820, contacts **839*a*, 894 and 807, upper winding of magnet 805, battery. It may be mentioned at this point that if the guard 1R wiper also encounters no ground in position 2 of the alloter switch, a similar circuit extending from ground at contact 841 through the winding of relay 30, contacts 827, 892 and 806 to the lower winding of magnet 805 and battery could be closed for switching relay 830 but the circuits of the two switching relays are arranged so that whichever relay happens to operate first opens the circuit of the other. Thus, if relay 820 is assumed to be the first to operate it opens at its contact 827 the operating circuit of the other switching relay 830; opens at its contact 828 the circuit of the lower winding of magnet 805; transfers at its contacts 829*a*, 829 the guard 1L wiper from the mid-point between the winding of relay 820 and the upper winding of magnet 805 to ground to guard the secondary finder, Fig. 4, against seizure from other secondary allotters; closes at contact 829*b* an operating circuit for slow-to-operate relay 860 over an obvious circuit; and prepares at contact 824 a ground connection to the start L wiper. Magnet 805 cannot operate with its upper winding alone energized in series with relay 820. As secondary allotter SA1I is associated with primary group 1, none of the connections between wipers M—1L, M—2L and M—3L and contacts 821, 822 and 823 is provided so that the closure of these three contacts is without effect in the case of this alloter. In the secondary allotter associated with allotter links 2 and 3** these wipers are also left unconnected.

Relay 860 in operating after a slight delay causes the operation of relay 870 which at its contact 873 completes the following start circuit for the secondary finder shown in Fig. 5: ground, contacts 873 and 823, start L wiper in position 2, conductor 96, winding of finder start relay 550, battery. Relay 550 in operating at its preliminary contact 552 connects the C1 wiper 74 of the secondary finder to the mid-point between the winding of finder switching relay 540 and finder magnet 560 by way of contacts 525, 535, 552 and 547; at its contact 553 closes ground to conductor 95; and at its Y contact 551 connects ground to the right hand terminal of relay 540. The aforementioned closure of ground to conductor 95 completes a circuit for relay 865 by way of the hold L wiper of the secondary allotter in position 2 and contacts 825, 874. This last-mentioned relay at its contacts 867, 868 transfers the winding of secondary allotter start relay 840 from ground at secondary start conductor 65 to local ground; and at its contact 866 causes the operation of lockout relay 810 in a circuit extending from ground at secondary start conductor 65 through contacts 802, the winding of relay 810, contact 866, resistance 899 to battery. Relay 810, in operating, at 811 closes a locking circuit for itself extending through contact 879 and resistance 899 to battery and at 812 opens another point in the original operating circuit for start relay 840.

Reverting now to the secondary finder, Fig. 5, the operation of this finder will depend on whether or not ground is removed by a primary finder in calling condition from the test conductor connected to the first contact in the C1 bank of the secondary finder. If this is not the case ground received from this test conductor over C1 wiper 74 will cause the operation of finder magnet 560 in a circuit extending over contacts 525, 535, 552, 547, and 561. The same ground short-circuits the winding of finder switching relay 540, thereby preventing the operation of this relay. Magnet 560 in operating, at its interrupter contact 561 re-opens the operating circuit of this magnet. Consequently magnet 560 releases thereby advancing the wipers of the secondary finder into position 2 and re-closing interrupter contact 561. As the calling primary finder, Fig. 4, is shown connected to the second set of contacts in the first bank set of the secondary finder ground has been removed from the corresponding test conductor 40 at contact 428 of relay 420 so that due to the absence of direct ground from the left-hand terminal of the winding of finder switching relay 540, this last-mentioned relay is allowed to operate in series with the winding of finder magnet 560 in the following circuit: ground, contact 551, winding of relay 540, contact 561, winding of magnet 560, battery. As the winding of relay 540 is of high resistance compared with that of magnet 560 switching relay 540 operates in this circuit while magnet 560 does not.

Figure 6:
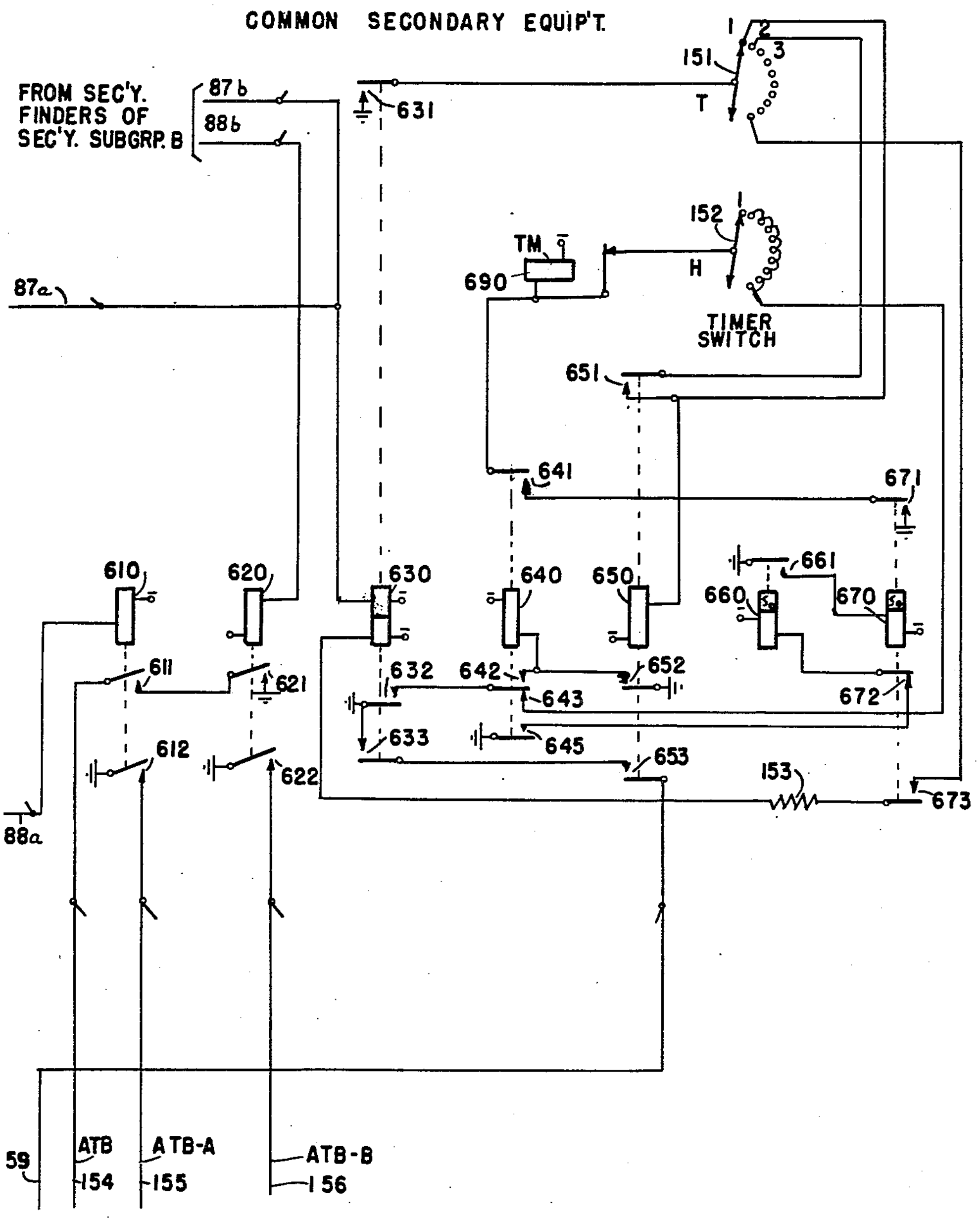

Relay 540 in operating, at contact 547, disconnects the junction point between the windings of relay 540 and magnet 560 from C1 wiper 74; at contact **549*a* removes a multiple ground from the winding of all-trunks-busy relay 610 which is associated with the A group of the secondary finders; at contacts 541, 542 switches the talking wipers 82, 81 of the secondary finder through to the talking conductors 84, 85 incoming to associated selector IS; at contact 543 connects test conductor 86 of the last-mentioned selector to the right hand terminal of the winding of swiching relay 540 to prepare the holding of this relay from the selector independent of contact 551; at contact 545 relay 540 closes ground, by way of contacts 535, 525 to C1 wiper 74, this circuit extending further by way of conductor 40 and contact 427 to the winding of relay 440 and battery; at contact 549 closes ground to conductor 94 to cause the operation of slow-to-release relay 850 in the secondary allotter by way of the guard 2L wiper of this allotter in position 2 and contacts 826, 875; at contact 548 connects ground to conductor 93, thereby to guard the secondary finder, Fig. 5, against seizure from another secondary allotter independently of the ground previously closed to this conductor at contact 829 of secondary allotter SA1I; and at contact 544 closes ground through resistance 83 to conductor 87*a*, thereby partially energizing the upper winding of relay 630, Fig. 6. As explained in greater detail hereinbelow relay 630 is provided to determine the amount of traffic in the full group of secondary finders and when operated it functions to keep the primary allotters of all allotter links from allotting directly trunked finders. Conductor 87*a* accordingly is multipled to contacts similar to contact 544, Fig. 5, of secondary finders of both component groups, and resistance 83 and the corresponding resistances in the other secondary finders are chosen so that traffic determining relay 630 will not operate until a predetermined number of secondary finders are in use and hence have their switching relays 840** operated.

1. *Primary finder found by related secondary finder*

For the purposes of the following subsection it will first be assumed that the primary finder is found by the related secondary finder, for instance because the call from the substation A in primary group 1 is the only one waiting for service at this time; and for the time being it will further be assumed that the primary finder, Fig. 4, finds the calling line before the "related" secondary finder, Fig. 5, finds that primary finder. In this connection it will be understood from the description given about that there is nothing in the circuits involved that would prevent the primary finder or even its wiper selector switch from hunting concurrently with the related secondary finder. If as assumed the primary finder finds first, switching relay 410 in the primary finder is already operated at the time that relay 440 operates upon the secondary finder reaching the primary finder, Fig. 4. Relay 440 in operating at its contact 444 opens the holding circuit extending over conductor 49 to relay 750 in the primary allotter and at contact 443 closes ground to guard conductor 53 by way of the already closed contact 417 of switching relay 410 so that relay 750 is permitted to release. Relay 725 then also restores with a slight delay due to its slow-release characteristics and upon the release of relay 760 ground is removed from secondary start conductor 65 at contact 769. Ground on guard conductor 53 also causes the primary allotter to be advanced to the next idle primary finder whereupon this allotter becomes available again for other calls as described in the preceding section.

As mentioned above, the operation of switching relay 540 in the secondary finder, Fig. 5, also causes the operation of relay 850 in secondary allotter SA1I over the circuit traced hereinbefore. This relay at its contact 851 closes a locking circuit for itself extending to ground at contact 861 and at contacts 853 and 854 closes obvious circuits for the upper and lower windings of shunt field magnet 805, respectively. Ground through contact 853 also causes switching relay 820 to be short-circuited by way of contacts 807, 894 and **839*a*. Shortly thereafter, magnet 805 in attracting its armature removes the battery connection for switching relay 820 at interrupter contact 807. Relay 820, in restoring, at its contact 825 causes the release of relay 865 and at its contact 829*b* lets relay 860 restore. Relay 865, in restoring, at contact 868 opens the local holding circuit for start relay 840, thereby permitting this relay to restore, and at contact 867 recloses a point in the operating circuit for this relay. Relay 860, upon releasing, at its contact 862 opens the circuit of slow-releasing relay 870 and at its contact 861 breaks the above-mentioned locking circuit of relay 850, but relay 850 is temporarily held in another locking circuit extending over contacts 863 and 876. When relay 850 is finally permitted to restore upon the release of relay 870 it removes ground, at contacts 853 and 854, from the two windings of shunt field magnet 805 respectively so that this magnet restores. Magnet 805, in releasing, advances the secondary allotter switch to the next following position, and since start relay 840** is released and remains released if no other call is waiting the secondary allotter will not be advanced beyond this point regardless of whether or not both guard 1 conductors connected to this position of the switch are grounded, that is irrespective of whether both of the two corresponding secondary finders happen to be in use. It should further be noted that since no guarding ground is connected to either of the two guard 1 wipers in allotter SA1I at this time any other secondary allotter that may, actively or inactively, rest on the same position is not disturbed by the aforementioned advancement of allotter SA1I.

When lockout relay 810 releases incident to the above-mentioned delayed removal of start ground from conductor 65 in the primary allotter, the winding of start relay 840 at contact 812 is re-connected to start conductor 65 in preparation for another call. If such other call in primary group 1 is waiting at this time it may happen that ground thus re-connected to conductor 65 re-operates start relay 840 by way of closed contacts 812 and 867 before relay 850 has had time to restore. However, while relay 840 may operate under this condition, switching relay 820 or 830 is prevented from re-operating because magnet 805 is still operated from ground at contacts 853, 854 and the battery connection to the switching relays accordingly open at interrupter contacts 806, 807. Thus, switching relay 820 or 830 cannot reoperate until magnet 805, upon restoring incident to the release of relay 850, has advanced the wipers of allotter switch SA1I to the next position and simultaneously re-closed interrupter contacts 806, 807. Therefore, if one of the secondary finders connected to the last-mentioned position of the switch is idle, switching relay 820 or 830 will operate and cause this finder to be seized; but this will not dislodge another secondary allotter already resting idly in this position as the stepping circuits for such other allotter are open under this condition. On the other hand, if both of the aforementioned secondary finders happen to be busy, allotter SA1I automatically will be further advanced in search of an idle secondary finder, in the manner described earlier in this section.

Reverting again to the operation of switching relay 540 in the secondary finder it will be appreciated that, with primary switching relay 410 already operated as assumed, calling subscriber A is now switched through to the line relay, not shown, of selector IS, Fig. 5, by way of the following loop circuit: substation A, line conductors 11, 12, primary finder wipers 19, 18, wiper selector switch wipers 32, 31, contacts 411, 412, conductors 38, 39, wipers 82, 80, contacts 521, 523, contacts 531, 533, contacts 541, 542, conductors 84, 85, windings of the selector line relay, to battery and ground, respectively. Upon the closure of this loop circuit the calling subscriver receives dial tone from selector IS in a well known manner. The selector line relay in operating causes the operation of the selector hold relay, not shown, which connects holding ground to conductor 86, thereby holding switch relay 540 operated in series with the winding of magnet 560.

The connection may now be further set up under the control of the calling subscriber's station and, after the connection has been completely set up, the called party is signalled in the usual manner. When the called subscriber answers by lifting his receiver the two subscribers may enter into conversation.

At the end of the call, when the calling party restores his handset to the cradle, the line relay in selector IS, Fig. 5, releases, in turn restoring the selector hold relay. This last-mentioned relay disconnects ground from conductor 86 so that relay 540 releases in the secondary finder. This relay at its contact 544 removes a multiple resistance ground from the upper winding of traffic determining relay 630; and at contact 545 removes ground from conductor 40 to permit relay 440 in the primary finder to release. This last-mentioned relay in turn at contact 442 causes the release of switching relay 410 and line cut-off relay 310. The circuits shown in Figures 3, 4 and 5 have thus been restored to their normal condition.

It was assumed above that the primary finder, Fig. 4, found the calling line before the related secondary finder, Fig. 5, found this primary finder. Assuming now that the reverse is true, that is, that the related secondary finder found the primary finder before the latter reached the line of the calling subscriber, then the secondary allotter, Fig. 8, on release is advanced one step before relays 750, 725 and 760 in the primary allotter are permitted to release, thereby removing start ground from secondary start conductor 65 at contact 769. Hence there would be the danger of the secondary allotter, Fig. 8, being re-started and another secondary finder seized by this last-mentioned allotter in spite of the fact that there is no primary finder waiting for service from a secondary finder at this time. This is avoided by the provision of lock-out relay 810 which at its contact 812 holds the circuit to allotter start relay 840 open until start ground is removed from conductor 65 upon the primary finder finding the calling line. When this occurs relay 810 releases, thereby re-preparing the operating circuit for start relay 840 at contact 812. Accordingly, if the primary allotter is subsequently taken into use by another call and ground is re-connected to start conductor 65 at contact 769, the operating circuit to start relay 840 can again be closed and secondary allotter SA1I seized as above described.

In the preceding description it was assumed that the call originated from a subscriber such as A1, Fig. 2, of primary group 1 and that accordingly secondary allotter SA1I was used to allot and control a secondary finder. If, instead, the call originates at a substation, say A6, of primary group 6, secondary allotter SA6I rather than SA1I would be used. This secondary allotter of allotter link 6 operates in the same manner as secondary allotter SA1I, but since the primary finders of group 6 one of which has been preselected by primary allotter PA6 are connected to the second level of the secondary finders as shown in Fig. 2, the wiper selecting relays, 510—530, of the secondary finder seized by allotter SA6I must be operated in a combination providing access to the second level. As will be seen from an inspection of Fig. 5, access to the second level will be had in the secondary finder if relay 520 is operated therein and this is accomplished by wiring wiper M2L to the make spring of contact 822 in secondary allotter SA6I, thereby making contact 822 effective to operate relay 520 of the allotted secondary finder upon seizure. Relay 520 in operating at its contact 527 prepares a locking circuit for itself which circuit becomes effective as soon as switching relay 540 in operating incident to the secondary finder finding the primary finder closes its contact 546. At contacts 522, 524, and 526 wiper selecting relay 520 connects up −2 wiper 81, +2 wiper 79, and C2 wiper 73, respectively, thereby causing the secondary finder to search for a calling primary finder connected to its second level of bank contacts.

The secondary allotters of allotter links 4 and 5 are wired in the same way, that is, in these allotters, too, wiper M2L is strapped to the make spring of contact 822. Similarly the secondary allotters of allotter links 7—9 have their contacts 823 strapped to their M3L wipers, thereby causing the operation of wiper selecting relay 530 in the allotted secondary finder by way of conductor 92; and the secondary allotters of allotter links 10—12 have both their contacts 821 and 823 strapped to their respective allotter wipers to cause both relays 510 and 530 in the secondary finder to operate over conductors 90 and 92 respectively.

It should be understood that what has been said above with respect to the connections of contacts 821 to 823 in the various first-choice secondary allotters applies correspondingly to contacts 831 to 833 of these allotters and also applies to contacts 921 to 923 and 931 to 933 in the associated second-choice secondary allotters.

2. *Primary finder found by non-related secondary finder*

In the preceding section it was assumed that the primary finder allotted by the primary allotter was found by the secondary finder allotted by the associated secondary allotter. This will be the case if only one call is waiting for service in the whole group; and it will also be the case whenever there are overlapping calls in primary groups which are served by different levels of the secondary finders. Thus assuming that a call has been originated in primary group 1 and another call simultaneously therewith has been originated in primary group 6, it will still be the secondary finder allotted by the secondary allotter of allotter link 1 that finds the primary finder seized by the primary allotter of this link and it will be the secondary finder allotted by the secondary allotter of allotter link 6 that finds the primary finder taken into use in primary group 6. This is for the reason that wiper selecting relay 520 which provides access to secondary level 2 is operated in the last-mentioned secondary finder only while the first-mentioned secondary finder, having none of its wiper selecting relays operated, can search for a primary finder over its first level only. On the other hand, if the second call instead of originating in primary group 6 originates in primary group 2 or 3 the primary finders of which are connected to the same level 1 of the secondary finders as the primary finders of group 1, it may happen that the allotted primary finder of group 1 is found by the non-related secondary finder, that is, the secondary finder allotted by the secondary allotter, say, of allotter link 2.

Let us first assume that in this case the primary finder of group 1 is found by the non-related secondary finder and also finds the calling line L1 before the related secondary finder, that is the secondary finder seized by secondary allotter SA1I, has had time to find the primary finder still in calling condition, that is, the primary finder in group 2. As soon as the aforementioned two release conditions for primary allotter PA1 are met ground is removed from secondary start conductor 65 at contact 769, Fig. 7, and accordingly there would be the danger of the secondary finder taken into use by allotter SA1I being stopped before this last-mentioned finder has found yet unserved primary finder in group 2. This is prevented by the provision of relay 865 which remains operated as long as the secondary finder is searching, thereby at its contact 868 holding start relay 840 of secondary allotter SA1I operated irrespective of the disconnection of start ground from start conductor 65. When the secondary finder just referred to finds the primary finder of group 2, relay 865 is released in the manner described above, thereby re-closing its contact 867. Since lockout relay 810 has previously released upon the aforementioned removal of ground from start conductor 65 the operating circuit for start relay 840 is now again prepared and may be completed upon the origination of another call.

On the other hand, should secondary allotter SA1I find the non-related primary finder before the primary finder of group 1 has found the calling line circuit L1 or before it has been found by the non-related secondary finder or both, the lock-out relay 810 of secondary allotter SA1I remains operated and its contact 812 accordingly opened until ground is removed from start conductor 65 after both release conditions for the primary allotter PA1 have been met. When this is the case lock-out relay 810 is permitted to restore and secondary allotter SA1I is thereby readied again for service of another call. In this manner the unnecessary re-starting of secondary allotter SA1I and a corresponding seizure and start of another secondary finder is avoided under the conditions just described.

PREMATURE RELEASE BY CALLING SUBSCRIBER

The operation of the circuits described herein in case the calling subscriber prematurely abandons his call will first be described on the assumption that a direct line finder has been allotted by primary allotter PA1. As explained under the corresponding heading above the selector DS, Fig. 4, directly associated with this line finder is seized as soon as start relay 420 upon operating closes its contact 421, with the result that relay 440 operates from ground returned by the selector over hold conductor 43, opening the holding circuit of allotter start relay 750 at its contact 444. Therefore, if the calling subscriber at substation A abandons the call before the line finder has had time to find the calling line circuit ground is completely removed at contact 712, upon the release of subgroup start relay 710, from the left hand terminal of the winding of relay 750 so that this relay restores and the following circuit is closed for stepping magnet 790 of the primary allotter switch: ground, contacts 753, 765, winding of magnet 790, battery. At contact 754 relay 725 is caused to release with a slight delay whereupon the circuit of relay 760 is opened at 726. When relay 760 restores it opens at its contact 765 the last-traced operating circuit for stepping magnet 790 so that the allotter switch is advanced to its next position. Interrupter contact 791 which was opened upon the operation of magnet 790 is re-closed upon the release of this magnet. If the line finder connected to the allotter switch in the last-mentioned position is idle the switch is arrested in this position; and if this line finder is busy the allotter switch is caused further to advance as described above until an idle finder is found. It may be mentioned at this point that in this preselecting operation a premature reseizure of the originally used line finder, Fig. 4, is prevented by virtue of the fact that upon release of finder start relay 420 incident to the opening of contact 762 of relay 760 a guard ground is temporarily connected to conductor 52 by way of make contact 443 and break contact 426. This guard ground is not removed until relay 440 restores upon the release of selector DS.

Assuming now that the primary allotter has allotted an indirectly trunked line finder, two cases should be distinguished, namely the case wherein the calling subscriber abandons the call before the primary finder has found the calling line and the further case in which the calling subscriber hangs up after the primary finder has found that line. Assuming that the primary finder has not reached the calling line circuit at the time the calling subscriber abandons his call, it will be understood that the primary allotter will not be freed under this condition for the reason that relay 750 is held operated over the primary finder by way of conductor 49. Both the primary and secondary allotters, therefore, maintain their searching operation until the secondary finder finds the primary finder, thereby causing the operation of relay 440. If the primary finder has already been found by the secondary finder at the time the subscriber abandons the call relay 440, of course, would already be operated. Holding ground for relay 750 is removed at contact 444 of relay 440 and the primary allotter is accordingly "kicked off" and caused to pre-select another primary finder as described above in connection with the directly trunked line finder. As in that case the primary finder, Fig. 4, is temporarily kept in guarded condition by ground extended to guard conductor 53 by way of contacts 443 and 426 until the selector, in this case the selector associated with the secondary finder, has completed its release. The secondary allotter also is advanced due to the operation of its relay 850 incident to the secondary finder finding the primary finder and when lock-out relay 810 finally restores due to the removal of ground from conductor 65 at contact 769 the secondary allotter also is ready to be seized in another call.

Assuming now that the calling subscriber abandons the call after the primary finder has reached the calling line but prior to this finder being found by the secondary finder it will readily be seen that the release of the two finder stages takes place substantially as just described except that in this case switching relay 410 in the primary finder is operated and a guard ground accordingly connected to conductor 53 as soon as relay 440 operates responsive to the primary finder being found by the secondary finder. When the selector releases incident to the opening of the calling loop, relay 440 is permitted to restore and this relay in releasing at its contact 442 opens the circuits of relays 410 and 310 as previously described.

From the foregoing remarks it will be understood that regardless of whether the primary finder has or has not found the calling line at the time the calling subscriber prematurely abandons the call, battery start relay 420 is kept in operated condition and marking battery for the secondary finder extending through the winding of relay 440 accordingly maintained at make contact 427 of relay 420 until the primary finder is found by the secondary finder. This prevents the secondary finder from searching in vain under this condition.

FINDER FAILS TO FIND LINE OR TRUNK DUE TO A FAULTY CONDITION

Timer relays 745 and 735 in the primary allotter and timer relays 880 and 875 in the secondary allotter are provided to prevent the respective allotters being withheld from service of other calls if the finder taken into use by these allotters fails to find the calling line or trunk due to an unstandard condition in the finder or allotter, for example an open connection in the test circuit. It is assumed that a common timing machine, not shown, of any well known type is provided, in the telephone exchange in question and that this common timer is connected with both the primary and secondary allotter by way of a first time pulse conductor 63 and a second time pulse conductor 64, the common timer being arranged repeatedly to connect a ground pulse to conductor 64 and 63 in periodic cycles.

Referring first to the primary allotter, it will be seen from an inspection of Fig. 7 that the circuit to timer relay 745 is prepared at contact 755 as soon as allotter start relay 750 operates. When a ground pulse is received over TP1 conductor 63 before relay 750 has had a chance to release relay 745 operates, at contact 746 connecting the winding of relay 735 to TP2 conductor 64 and at contacts 747, 748 transferring the winding of relay 745 from conductor 63 to direct ground at the left hand terminal of the winding of relay 750. Should relay 750 and accordingly, relay 745 still be operated when ground is received over the TP2 conductor near the end of another timer cycle, relay 735 will operate from this ground pulse and close an obvious circuit to allotter switch magnet 790 at contact 736. Magnet 790 in operating at its contact 791 disconnects battery from the right hand terminal of relay 750, thereby causing the release of this relay which in turn lets relays 745, 735 and relays 725, 760 restore. The allotter switch accordingly is "kicked off" from the faulty finder and caused to preselect another idle finder. If ground is still connected to the left hand terminal of the winding of relay 750 at this time the allotter switch will seize this last mentioned line finder and start this finder in search of a calling line. Timer relays 745 and 735 also function to free the primary allotter after a predetermined time interval if the secondary allotter for some reason is unable to allot a secondary finder so that no secondary finder is started in search of the primary finder.

Timer relays 880 and 877 in the secondary allotter, Fig. 8, function in a similar manner in case the secondary finder taken into use or attempted to be taken into use by the secondary allotter fails to find a primary finder within a predetermined time. In this case relay 880 is allowed to operate from TP1 conductor 63 by way of contacts 871 and 882 and subsequently relay 877 is permitted to operate over TP2 conductor 64 and contact 883. The first-mentioned relay is locked to ground by way of contacts 872 and 881 and an obvious circuit closed at contact 878 for relay 850. The operation of relay 850 causes the secondary allotter to be advanced one step as described hereinbefore. Relay 877 in operating at its contact 879 also opens the locking circuit of lock-out relay 810, thereby causing the release of this relay irrespective of whether or not ground is connected to secondary start conductor 65 at that time. When relay 870 releases incident to the operation of relay 850 and magnet 805 and the consequent release of relays 820 and 860 as described above it permits, at its contact 872, relay 880 to restore; relay 877 which, due to the ground pulse on TP2 conductor 64 being of relatively long duration, has remained operated up to this time, now releases also, thereby at its contact 879 re-preparing the holding circuit for lock-out relay 810. Due to the aforementioned advancement of the secondary allotter to its next position, re-seizure of the faulty secondary finder upon the next seizure of the secondary allotter is prevented.

DIRECT FINDERS MADE FIRST CHOICE ON PREDETERMINED AMOUNT OF TRAFFIC

Referring now to Fig. 6 there is shown a traffic determining relay 630 to which reference has been made hereinbefore, together with auxiliary relays 640 to 670 and a timer switch of the rotary stepping type having stepping magnet 690 and two wipers T and H and associated contact rows. This timer switch may have any desired number of contact positions depending on the time interval after which this timer is desired to become effective. For purposes of example it may be assumed that this timer switch has a 10-point contact bank similar to the wiper selector switch shown in Fig. 4. As shown in Fig. 6, relay 630 is arranged when operated to ground at its contact 633, and by way of contact 653 of relay 650, a control conductor 59 connected in multiple to all primary allotters as may be seen from Fig. 7.

When relay 630 operates upon the traffic through the full group of secondary finders having reached a predetermined amount, that is, after a predetermined number of resistance ground connections have been closed at contacts similar to contact 544, Fig. 5, to the upper winding of relay 630 by way of conductor **87*a* associated with component group A and/or conductor 87*b* associated with component group B, relay 630 operates as briefly mentioned above. At its contact 633, relay 630 in operating closes a point in the operating circuit extending over control conductor 59 to relays 780 of all primary allotters; and at contact 632 closes a homing circuit for the timer switch in case the switch happens to be resting in a position other than position 1. This homing circuit may be traced from ground through contacts 632 and 643, homing bank of the timer switch, H wiper 152, interrupter contact 691, stepping magnet 690 of the timer switch to battery. Due to the interrupter action of contact 691 the timer switch is thus advanced to its first position in which the homing circuit can no longer be closed upon the re-closure of interrupter contact 691**.

In this position relay 650 is operated by way of ground, contact 631 of relay 630, T wiper in position 1, winding of relay 650, battery. Relay 650, in operating at its contact 653, completes the ground connection to control conductor 59 the results of which will be described in greater detail hereinafter; at 652 closes an obvious circuit to relay 640; and at 651 closes a point in a locking circuit for itself extending over the second contact in the T bank of the timer switch. Relay 640, in operating, at its contact 642 locks to ground at contact 632; at contact 643 opens another point in the homing circuit of the timer switch; at 641 prepares a slow-stepping circuit for the timer switch magnet; and at 645 causes the operation of slow to operate relay 660 by way of contact 672. Relay 660 in operating at contact 661 closes an obvious circuit to the winding of slow to operate relay 670. This last mentioned relay, upon its operation, at contact 671 completes an energizing circuit extending over contact 641 to the winding of timer switch magnet 690; at contact 672 opens the operating circuit of relay 660; and at contact 673 prepares a circuit to the differentially wound lower winding of relay 630. Relay 660 releases due to its circuit being opened at contact 672, in turn opening the operating circuit of relay 670. Relay 670 in restoring re-closes the operating circuit of relay 660 and opens the operating circuit for stepping magnet 690 so that the timer switch is stepped to position 2 in which the aforementioned locking circuit is completed for relay 650. As the mutual interrupting action of relays 660 and 670 continues the locking circuit of relay 650 is opened in position 3 so that this relay in restoring removes ground from conductor 59, and the timer switch is further advanced unitl it reaches its last position. When relays 660 and 670 subsequently re-operate the following circuit is completed for the differentially wound lower winding of traffic determining relay 630: ground, contact 631, wiper 151 in the last position of the timer switch, contact 673, limiting resistance 153, lower winding of relay 630, battery. Upon the following release of relays 660 and 670, the last-traced circuit is re-opened at 673 and at contact 671 the switch is caused to step to its first position.

With regard to the functioning of relay 630 three cases should be distinguished:

1. The traffic through the full group of secondary finders is of such magnitude that the current through the upper winding of relay 630 is the same at the end of the timing period as it was at the beginning of this period, or has risen only slightly during that period or has dropped only slightly during that period, that is, has not dropped, in any event, below the holding value of the relay during the timing period. In this case the energization of the lower winding of relay 630 at the time the timer reaches its last position permits the relay to restore at that moment. After the relay has released in this manner it will not re-operate upon the opening of contact 673 unless or until the current through its upper winding again exceeds the operating value of relay 630.

2. The traffic through the group of secondary finders decreases to such an extent that the current through the upper winding of relay 630 drops below the holding value of this relay before the timer switch reaches its last position. In this case relay 630 releases prematurely and relay 640 also releases provided that, or as soon as, relay 650 in restoring in position 3 opens the locking circuit of relay 640 at 652 and the timer switch remains in the position reached at that time, to be homed only upon the next re-operation of relay 630 when the secondary traffic has risen beyond the critical magnitude. It will be observed that if relay 630 releases while relay 650 is still held operated under the control of the timer switch the ground pulse transmitted over control conductor 59 will correspondingly be shortened.

3. If the secondary traffic experiences a considerable increase during the timing interval so that the current through the upper winding of relay 630 is correspondingly increased, the opposing energization of the lower winding of this relay may be insufficient to cause the relay to restore in the last position of the switch and as a result the time switch will go through one or more further operating cycles before the relay can restore.

Each time control conductor 59 is grounded through contacts 633 and 653 in series as described above a circuit is closed to relay 780 in all primary allotters whose relay 760 is in released condition and in which, in addition, either relay 770 or 775 or both are at normal. This circuit may be traced as follows: ground, contacts 633 and 653, conductor 59, contact 761, contact 771 and/or 776, winding of relay 780, battery. In each primary allotter in which relay 780 operates it closes contacts 781 to 788, thereby connecting guarding ground to the guard conductors of the eight indirectly trunked line finders respectively as shown in Fig. 7. Therefore, should one or more of these primary allotters rest on any of the indirectly trunked line finders the self-interrupting circuit extending from the guarding ground through wiper 69 and contacts 752, 716 and 791 will be closed to the stepping magnet such as 790, Fig. 7, of the particular primary allotters; and since all the guard conductors corresponding to the indirectly trunked finders are now grounded at the contacts of the associated relay 780, each of these primary allotters will be automatically stepped to its position 1 which gives access to the first directly trunked line finder connected thereto. Under this exceptional condition the primary allotter switch, therefore, is "homed." It will be understood, of course, that if this first directly trunked line finder happens to be busy the allotter switch is immediately advanced another step to preselect the second directly trunked line finder.

It will further be understood that each of the primary allotters in question will thus continue to be barred from access to the indirect line finders as long as its relay 780 remains energized. In this manner the traffic in each of the primary groups involved is diverted into the line finders individual to the group.

Contact 761 on relay 760 is provided to prevent the operation of relay 780 as long as the particular primary allotter is busy serving a line finder of either category. The windings of relays 770 and 775 are connected to the guard conductors of the two direct line finders respectively. Thus, when both of these finders are in use both relays 770 and 775 are operated so that both contacts 771 and 776 are open and this constitutes another case in which the circuit to relay 780 of the primary allotter in question cannot be completed. In this way the useless "homing" of the primary allotter under an all-direct-trunks-busy condition is prevented.

Due to the fact that conductor 59 is grounded, at periodic intervals, only during the time when both relays 630 and 650 are operated it can happen that the primary allotter upon release from a line finder, preselects and seizes one of the indirect line finders in the interval between two such ground pulses on conductor 59. In this manner a limited amount of traffic is permitted to flow into the indirectly trunked line finders even at times when the secondary traffic is large enough to cause traffic determining relay 630 to be operated. This will counteract frequent "cycling" of the traffic control system as the small amount of traffic thus allowed to trickle into the secondary-trunked finders will tend to keep the current through the upper winding of relay 630 above the operating value of this relay even though part of the traffic is diverted into the direct line finders.

The amount of traffic that is in this fashion allowed to flow into the common finders may be regulated by straps between contact 2 and the following contacts of the T bank of the timer switch, Fig. 6. For example if contacts 2 and 3 in the T bank of this switch are strapped relay 650 will remain operated and accordingly keep its contact 653 closed until the switch reaches position 3. By extending this strapping over further contacts of the T bank, relay 650 can if desired be held operated throughout, virtually, the entire stepping operation of the timer switch. In fact, it will also be understood that the traffic control apparatus, Fig. 6, could be designed so as to maintain ground on control conductor 59 uninterruptedly as long as the secondary traffic remains above the desired critical level. In the design of the traffic control apparatus as actually shown in Fig. 6 relay 630 is periodically given an opportunity to release and this avoids that the relay, once operated, stays operated until the current through its upper winding drops below the holding value of the relay. This would tend to bar the primary allotters from access to the individually trunked line finders for a longer period than necessary and would, to that extent, result in needless stepping of the primary allotter switches between calls and in a corresponding excessive wear of the direct finders.

ALL TRUNKS BUSY CONDITION

Taking first the case of all line finders of both categories being in use in a given primary group ground is removed under this condition from conductor 48, Fig. 4, at contacts 415 of the switching relay 410 of all line finders of the group. All-trunks-busy relay 715, Fig. 7, accordingly releases, thereby breaking the operating circuit of relay 750 at contact 17 and breaking the circuit of stepping magnet 790 at contact 716. As mentioned above the locking circuit for relay 715 which extends to ground at contact 766 is provided to prevent the release of all-trunks-busy relay 715 while the primary allotter is in use.

Relays 610 and 620, Fig. 6, are provided to indicate an all-trunks-busy condition in component groups A and B respectively of the secondary finders. If, for instance, all secondary finders of component group A are in use all ground connections are removed at contacts similar to **549*a* from conductor 88*a* which is common to component group A and relay 610 accordingly releases. If the battery connection for this relay is fused through a circuit fuse common to the secondary finders of component group A then relay 610 also releases in case this common circuit fuse blows. Relay 620 associated with component group B and normally held operated over conductor 88*b*** releases under similar conditions.

There is provided in each of allotter links 1–6 a transfer relay such as relay 800, the upper winding of all these relays being connected to ATB–A conductor 155, Figs. 6 and 8. If all-trunks-busy relay 610 of component group A releases, contact 612 closes ground to conductor 155, thereby causing the operation of transfer relay 800 in each of allotter links 1–6. Taking, for instance, the case of allotter link 1, relay 800, Fig. 8, in operating, at contacts 802, 801 transfers the secondary start conductor 65 from the start circuit in secondary allotter SAII of this link to the corresponding start circuit in the second choice secondary allotter SAIII, Fig. 9, of this link. At contact 803 relay 800 locks by way of its lower winding to ground at a contact 913 additionally provided on relay 910, thereby preventing the release of transfer relay 800 while the lock-out relay 910 of allotter SAIII is operated, that is, while the last-mentioned allotter is in use in a given call. As long as relay 800 is operated all calls will accordingly be handled by the second choice instead of the first choice allotter, the second choice allotter having access to the secondary finders of component group B as described above.

Figure 9:
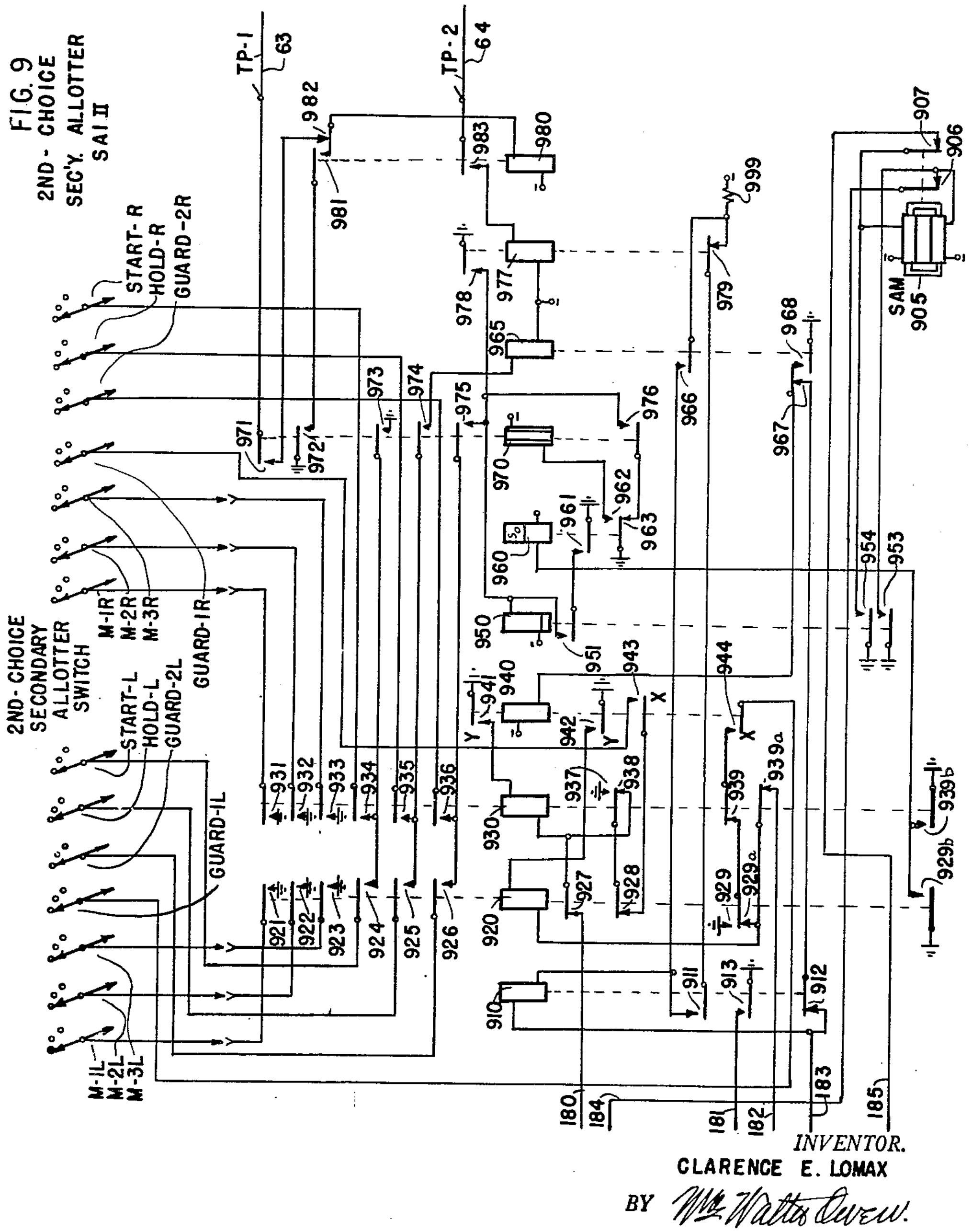

With the exception of relays 800 and 890 which have been shown as a part of Fig. 8 but are actually common to both secondary allotters and with the further exception of the above-mentioned contact 913, both allotters, Fig. 8 and Fig. 9, are alike. Corresponding apparatus in Fig. 9 have therefore been designated by reference numerals similar to those used in Fig. 8 except that 9 instead of 8 has been used as the first figure. Because of this correspondence of the first and second choice allotters it is believed that a detailed description of the second choice allotter can be dispensed with.

When all-trunks-busy relay 620 of component group B releases ground is connected at contact 622 to ATB–B conductor 156 which leads to transfer relays similar to 800 in allotter links 7–12. The last mentioned relays also effect the transfer from the first choice to the second choice allotters in these links except that, as explained in connection with Fig. 2 hereinbefore, the first choice allotters of these links give access to the secondary finders of group B and the second choice allotters of these links give access to the secondary finders of group A. Otherwise the result of the operation of transfer relays 800 of allotter links 7–12 is the same as described above for groups 1–6.

Should both component groups A and B become busy at the same time so that both relays 610 and 620 release the following circuits would be closed for full-secondary-group-busy relay 890: ground, contacts 621, 611, ATB conductor 154, winding of relay 890, battery. Relay 890 one of which is provided in each allotter link, at contacts 892, 894 opens the operating circuits of both windings of the stepping magnet, 805, of the first choice secondary allotter, Fig. 8, and at contacts 891, 893 opens the operating circuits of both windings of the stepping magnet, 905, of the second choice secondary allotter, Fig. 9, thereby insuring that neither of these allotters is taken into use under the last-mentioned condition. If desired, alarms could, of course, be operated from any of the all-trunks-busy relays referred to above.

While only two embodiments of this invention have been illustrated and described, it is to be understood that numerous modifications in the details of arrangement may be resorted to without departing from the true spirit and scope of the invention as defined in the appended claims. Thus, referring again to Figs. 8 and 5 and the trunking diagram, Fig. 2, it will be recalled that contacts 821–823 are wired alike in allotter links 1–3, again wired alike in allotter links 4–6 etc. In other words, in the particular trunking arrangement shown in Fig. 2, the link-identifying marking applied by the secondary allotter to the secondary finder merely serves to indicate to that finder the particular level, that is, the particular set of three primary trunk groups, over which it has to search. It should be understood however that instead of effecting such marking on a set-of-three-groups basis as in Fig. 2 or on a set-of-two-groups basis as in Fig. 1 it could also be carried out on an individual-group basis. In this case each individual allotter link would transmit a different identifying marking to the allotted secondary finder and, accordingly, the particular primary group for which a given secondary finder has to search would be identified to this finder upon seizure by the secondary allotter. This condition would be met, for instance, if in the embodiment described only one instead of three primary groups were connected to each level of secondary finders.

Assuming, then, a trunking scheme providing for such an individual group identification it will readily be seen that in the case of overlapping calls in different groups a given primary finder will invariably be found by the "related" secondary finder. In this case the allotter links can be simplified further, for instance by the provision of common timer relays for the primary and secondary allotter of each given allotter link. Moreover, since the finding of the primary allotter by the secondary finder is conclusively indicated in this case by the freeing of the secondary allotter under the direct control of the related secondary finder, the allotter link as a whole could be released when the primary finder has completed its search under the control of the primary allotter and the secondary finder has completed its search under the control of the secondary allotter. As a result, means such as relay 440, Fig. 4, for preventing the release of the primary allotter until the primary finder has both found and been found could be dispensed with in the primary stage. The foregoing modification thus points up another advantage of the provision of allotter links in accordance with one of the principles of the present invention.

What is claimed is:

1. In a telephone system, primary line finder means, secondary finder means having access to said primary finder means, said primary finder means comprising a number of groups, a corresponding number of primary allotters, each for one of said primary groups, and a corresponding number of secondary allotter means for said secondary finder means, each of said secondary allotter means being individually connected with the respective primary allotter.

2. In a telephone system, a plurality of primary line finders comprising a number of groups, a group of secondary finders having access to the finders of said primary groups in common, said secondary group including at least as many secondary finders as there are primary groups, a primary-finder start means for each of said primary groups, a secondary-finder start means for each of said primary groups, each of said secondary start means being responsive to the operation of the corresponding primary start means for causing one of said group of secondary finders to be taken into use, whereby there may be as many secondary finders searching simultaneously as there are primary groups.

3. In a telephone system, a plurality of lines, primary line finder means, secondary finder means having access to said primary finder means, said primary finder means comprising a number of groups, a corresponding number of primary allotter means each for one of said primary groups, and a corresponding number of secondary allotter means for said secondary finder means, each of said secondary allotter means being individually connected with the respective primary allotter to form an allotter link therewith and there being at least as many secondary finder means as there are primary groups, and start means in each of said allotter links and operative in response to the origination of a call in the respective primary group for starting an allotted one of the corresponding primary line finder means in search of the calling line and starting an allotted one of said secondary finder means in search of said primary finder means, whereby there may be as many secondary finder means searching simultaneously as there are primary groups.

4. In a telephone system, primary line finder means, a group of secondary finder means serving said primary finder means, said primary finder means comprising a number of groups, a corresponding number of primary allotters each for one of said primary groups and a corresponding number of secondary allotter means for said secondary finder means, said secondary group comprising at least as many secondary finder means as there are primary groups, each of said secondary finder means of said secondary group having access to all the line finders served by each of said primary allotters, and each of said secondary allotter means being individually connected with the respective primary allotter to form an allotter link therewith, and start means in each of said allotter links and operative in response to the origination of a call in the respective primary group for starting an allotted one of the corresponding primary finder means in search of the calling line and starting an allotted one of said secondary finder means in search of said primary finder means, whereby there may be as many secondary finder means simultaneously searching in said secondary group as there are primary groups served by said secondary group.

5. In a telephone system, a plurality of line circuits divided into a number of groups, a plurality of primary line finders having access to said line circuits and comprising a corresponding number of groups, a plurality of secondary finders having access to the finders of said primary groups in common, primary-finder allotting means for each of said primary groups, secondary-finder allotting means for each of said primary groups, a given one of said primary allotting means being operative in response to the origination of a call in a line circuit of the associated primary group for starting one of said primary finders in search of said line circuit, causing said finder to be marked to said secondary finders as requiring service and starting the particular secondary allotting means associated with said primary allotting means, and the last-mentioned secondary allotting means being operative upon being started for causing one of said secondary finders to search for a marked primary finder, said primary allotter means including means effective only after the started primary finder has found the calling line circuit and has, itself, been found by a secondary finder for freeing both said primary and secondary allotting means.

6. In a telephone system, a plurality of lines, primary line finder means, secondary finder means, said primary finder means comprising a number of groups, a corresponding number of primary allotters each for one of said primary groups and a corresponding number of secondary allotter means for said secondary finder means, each of said secondary finder means having access to primary finder means in a plurality of said primary groups and each of said secondary allotter means being individually connected with the respective primary allotter to form an allotter link therewith, each of said allotter links including means responsive to the origination of a call in the respective primary group for starting an idle one of the corresponding primary finder means in search of the calling line, causing said finder means to be marked to said secondary finder means as requiring service and starting an idle one of said secondary finder means in search of a marked primary finder means, means responsive to said started primary finder means having found the calling line and having, itself, been found by a secondary finder means to free said primary allotter for service of another primary finder means, and means governed by said started secondary finder means for maintaining the searching operation of the last-mentioned finder means irrespective of the freeing of said primary allotter if at the time of such freeing said started secondary finder means has not yet found a primary finder means, whereby in the case of overlapping calls in a plurality of primary groups as many secondary finder means are kept in use as there are calling primary groups regardless of whether or not a given primary finder means is found by a secondary finder means taken into use by the same allotter link that took said primary finder means into use.

7. In a telephone system, a plurality of lines, primary line finder means, secondary finder means, said primary finder means comprising a number of groups, a corresponding number of primary allotters each for one of said primary groups, and a corresponding number of secondary allotter means for said secondary finder means, each of said secondary finder means having access to primary finder means in a plurality of said primary groups and each of said secondary allotter means being individually connected with the respective primary allotter to form an allotter link therewith, each of said allotter links including control means effective upon the primary finder means taken into use by said primary allotter having found a calling line and having itself, been found by a secondary finder means, to free said primary allotter for service of another primary finder means, and control means normally effective upon the secondary finder means taken into use by said secondary allotter means having found a primary finder means to free said secondary allotter means for service of another secondary finder means, and means governed by said first-mentioned control means for preventing another secondary finder means from being taken into use by said secondary allotter means if at the time the first-mentioned secondary finder means has found a primary finder means said primary allotter means has not yet been freed, whereby, in the case of overlapping calls in a plurality of primary groups, only as many secondary finder means are taken into use as there are calling primary groups regardless of whether or not a given primary finder means is found by a secondary finder means taken into use by the allotter link that took said primary finder means into use.

8. In a telephone system, primary line finder means, secondary finder means, said primary finder means comprising a number of groups, a corresponding number of primary allotters each for one of said primary groups, and a corresponding number of secondary allotter means for said secondary finder means, each of said secondary finder means having a plurality of sets of outlets each set giving access to primary finder means in a different one or different ones of said primary groups, and each of said secondary allotter means being individually connected with the respective primary allotter to form an allotter link therewith and including means effective upon an idle secondary finder means being taken into use for selecting one of said sets of outlets of the last-mentioned finder means in accordance with the group identity of said allotter link.

9. In a telephone system, a group of lines comprising a number of subgroups, a line circuit connected with each of said lines, a plurality of line finder switches serving said group of lines, allotter apparatus for allotting one of said finder switches, each of said finder switches having a plurality of sets of wipers and banks, each set giving access to one of said subgroups, and each finder switch having associated therewith a wiper selecting switch having a set of wipers and banks including a test wiper and bank, means effective upon the origination of a call in one of said subgroups to mark the banks of said finder switches in accordance with the line circuit calling, mark the test bank of the wiper selecting switch of the allotted finder switch in accordance with the subgroup calling and start said wiper selecting switch in search of said second-mentioned marking, and means operative upon the completion of the search of said wiper selecting switch for preparing a test circuit for said finder switch extending over a wiper and bank of said wiper selecting switch and said finder switch in series and start said finder switch in search of said first-mentioned marking.

10. In a telephone system, the combination as defined in claim 9 and wherein said allotter apparatus includes subgroup identifying means and a common finder stopping device, said identifying means being effective upon the origination of a call in one of said subgroups to mark the test bank of said wiper selecting switch in accordance with the subgroup calling and said test circuit of said finder switch extending from said common stopping device over a wiper and bank of said wiper selecting switch and said finder switch in series.

11. In a telephone system, a group of lines comprising a number of subgroups, a plurality of primary finder switches serving said group of lines, a plurality of secondary finder switches serving said primary finder switches, primary allotter apparatus for allotting one of said primary finder switches, secondary allotter apparatus for allotting one of said secondary finder switches, each of said primary finder switches having a plurality of sets of wipers and banks, each set giving access to one of said subgroups, and each primary finder switch having associated therewith a wiper selecting switch having a set of wipers and banks, means effective upon the origination of a call in one of said subgroups to mark the calling line, the calling subgroup and the allotted primary finder switch and start the wiper selecting switch of the allotted primary finder switch on a positioning operation in accordance with said second-mentioned marking and the allotted secondary finder switch on a positioning operation in accordance with said third-mentioned marking, whereby said secondary finder switch and said wiper selecting switch may be simultaneously engaged in their respective positioning operations, and means operative upon the positioning of said wiper selecting switch for starting said primary finder switch in search of said first-mentioned marking.

12. In a telephone system, a group of lines comprising a number of subgroups, a line circuit connected with each of said lines, a plurality of primary finder switches serving said groups of lines, a plurality of secondary finder switches serving said primary finder switches, primary allotter apparatus for allotting one of said primary finder switches, secondary allotter apparatus for allotting one of said secondary finder switches, each of said primary finder switches having a plurality of sets of wipers and banks, each set giving access to one of said subgroups, and each primary finder switch having associated therewith a wiper selecting switch having a set of wipers and banks including a test wiper and bank, means effective upon the origination of a call in one of said subgroups to mark the banks of said primary finder switches in accordance with the line circuit calling, mark the test bank of the wiper selecting switch of the allotted primary finder switch in accordance with the subgroup calling, mark the banks of said secondary finder switches in accordance with the allotted primary finder switch, start said wiper selecting switch in search of said second-mentioned marking and start the allotted secondary finder switch in search of said third-mentioned marking, whereby said secondary finder switch and said wiper selecting switch may be searching simultaneously, and means operative upon the completion of the search of said wiper selecting switch for starting said primary finder switch in search of said first-mentioned marking.

13. In a telephone system, two switching stages each comprising fast-stepping rotary hunting switches, the switches of both stages being of the same general mechanical design and each switch having a stepping magnet, an absence-of-ground searching test circuit controlling the hunting of the switches of said one stage, a battery-searching test circuit controlling the hunting of the switches of said other stage, an impedance common to a plurality of switches of the last-mentioned stage and means operative upon one of said last-mentioned switches being taken into use for connecting said common impedance in series with the stepping magnet of said switch to reduce its speed.

14. In a telephone system, two switching stages each comprising fast-stepping rotary hunting switches, the switches of both stages being of the same general mechanical design and each switch having a stepping magnet, an absence-of-ground searching test circuit controlling the hunting of the switches of said one stage, a battery-searching test circuit controlling the hunting of the switches of said other stage, said last-mentioned stage being a line finder stage, an allotter associated with said line finders and including a common impedance, means operative upon said allotter taking one of said line finder switches into use for connecting said common impedance in circuit with the stepping magnet of the finder switch taken into use to reduce the stepping speed of said switch, and common finder stopping means in said allotter and operative over the last-mentioned test circuit upon said finder switch having completed its hunting for opening said magnet circuit.

15. In a telephone system, allotter apparatus comprising an allotter switch having a set of wipers and contact banks, a plurality of finders connected to said banks, said allotter apparatus including means operative upon the initiation of a call for testing the finder connected to the set of bank contacts on which said wipers are resting for its busy condition and if said finder is busy at that time, causing said allotter switch to search for an idle finder and said finder to be taken into use, and means operative under the control of said finder after said finder has completed its finding operation for advancing the wipers of said allotter switch one step to the next finder connected to said set of banks, regardless of whether the last-mentioned finder is idle or busy, and for preventing said allotter apparatus from being freed for service of other calls before said wipers have thus been advanced.

16. In a telephone system, primary line finders, secondary finders having access to said primary finders, said primary finders comprising a number of groups, a corresponding number of primary allotters each for one of said primary groups and a corresponding number of secondary allotter means for said secondary finders, each of said secondary allotter means being individually connected with the respective primary allotter to form an allotter link therewith, and comprising a secondary allotter switch having a set of wipers and contact banks, means operative upon a start condition arising in said allotter link for testing the secondary finder connected to the set of bank contacts on which said wipers are resting for its busy condition and, if said finder is busy at that time, causing said switch to search for an idle secondary finder and operative upon said secondary allotter means taking said finder into use incident to said start condition in said allotter link for busying said finder to the secondary allotter switch of other allotter links, and means operative subsequent to said finder having completed its finding operation for tentatively advancing said wipers onto the set of bank contacts giving access to another secondary finder without busying the last-mentioned finder to the secondary allotter switches of other allotter links and regardless of whether or not the wipers of a secondary allotter switch of another allotter link have thus already been tentatively advanced onto the bank contacts corresponding to the last-mentioned finder.

17. In a telephone system, a plurality of finders, an allotter switch comprising a two-winding stepping magnet having a core which forms a closed magnetic circuit and includes two legs carrying said two windings respectively, and having an armature disposed opposite said core so as to be attracted upon energization of both said windings only, said allotter switch also comprising two sets of wipers and banks, each set including a test wiper and bank, pairs of guard conductors connecting in each switch position corresponding pairs of said finders with said two test banks respectively, means in each finder for applying a guarding potential to the corresponding guard conductor when in use, two test circuits each including one of said magnet windings, one of said test wipers and banks and one of said guard conductors in series, and means in said allotter switch and effective upon the initiation of a finder-selecting operation of said switch for causing both guard conductors of a pair to be simultaneously tested by way of said test circuits for the presence or absence of said guarding potential, the presence of guarding potential on both guard conductors of a tested pair causing both of said windings to be energized so as to operate said stepping magnet.

18. In a telephone system, a plurality of finders, an allotter switch comprising a two-winding stepping magnet having a core which forms a closed magnetic circuit and includes two legs carrying said two windings respectively, and having an armature disposed opposite said core so as to be attracted upon energization of both said windings only, said allotter switch also comprising two sets of wipers and banks, each set including a test wiper and bank, pairs of guard conductors connecting in each switch position corresponding pairs of said finders with said two test banks respectively, means in each finder for applying a guarding potential to the corresponding guard conductor when in use, two switching relays in said allotter switch respectively controlling said two wiper sets, the winding of said relays having a high resistance compared with the resistance of said magnet windings and means effective upon the initiation of a finder-selecting operation of said allotter switch for connecting each of said two switching relays in series with the corresponding winding of said magnet and connecting each of said test wipers to the junction point between the associated magnet winding and switching relay, the presence of guarding potential on both guard conductors of a tested pair causing both of said relays to be shunted out and both of said magnet windings to be energized sufficiently to operate said magnet, whereby said allotter switch is advanced to the next pair of finders, and the absence of guarding potential from a guard conductor of a tested pair causing one of said switching relays to be operated in series with the corresponding magnet winding without permitting said magnet to operate, whereby the allotter switch is switched through to the corresponding finder of the pair.

19. In a telephone system, a plurality of lines, a plurality of line finders serving said lines, an allotter of the non-homing type serving at least some of said finders, the finders served by said allotter including both individually trunked line finders and commonly trunked line finders, means in said allotter operative upon the initiation of an allotter operation for normally selecting an idle one of the line finders served by said allotter irrespective of their kind of trunking, and means operative upon the traffic originating from said lines reaching a predetermined amount for rendering said commonly trunked finders unavailable to said allotter.

20. In a telephone system, a group of line finders divided into a number of subgroups, an allotter for each of said subgroups, each of said allotters serving both individually trunked line finders and commonly trunked line finders, means in each of said allotters operative upon the initiation of an allotting operation for normally selecting an idle one of the line finders served by said allotter irrespective of their kind of trunking, and means operative upon a predetermined number of commonly trunked finders in said whole group being in use for rendering said commonly-trunked finders unavailable to said allotters.

21. In a telephone system, a group of line finders divided into a number of subgroups, an allotter of the non-homing type for each of said subgroups, a plurality of secondary finders serving said subgroups in common, a group of numerical switches, the line finders served by each of said allotters including both line finders that are trunked to a corresponding one of said numerical switches directly and line finders that are trunked to a number of said numerical switches by way of said secondary finders, means in each of said allotters operative upon the initiation of an allotting operation for normally selecting an idle one of the line finders served by said allotter regardless of their kind of trunking, and means operative when a predetermined number short of all of said secondary finders are busy for rendering said secondary-trunked line finders unavailable to said allotters.

22. In a telephone system, a group of line finders divided into a number of subgroups, an allotter of the non-homing type for each of said subgroups, a plurality of secondary finders serving said subgroups in common, a group of numerical switches, the line finders served by each of said allotters including both line finders which are trunked to a corresponding one of said numerical switches directly and line finders which are trunked to a number of said numerical switches by way of said secondary finders, means in each of said allotters operative upon the initiation of an allotting operation for normally selecting an idle one of the line finders served by said allotter regardless of their kind of trunking, and means operative when a predetermined number short of all of said secondary finders are busy for causing said allotter, upon the initiation of an allotting operation, to be automatically advanced towards one of said directly-trunked line finders.

23. In a telephone system, a group of line finders divided into a number of subgroups, an allotter of the non-homing type for each of said subgroups, a plurality of secondary finders serving said subgroups in common, a group of numerical switches, the line finders served by each of said allotters including both line finders that are trunked to an associated one of said numerical switches directly and line finders that are trunked to a number of said numerical switches by way of said secondary finders, means associated with each of said allotters and operative upon the release of said allotter after serving a call for normally preselecting an idle one of the line finders served by said allotters regardless of their kind of trunking, and means operative when a predetermined number short of all of said secondary finders are busy for artificially busying all of said secondary-trunked line finders to said allotter, whereby said allotter is caused to preselect one of said directly-trunked line finders and means for preventing the last-mentioned means from becoming effective when all of said directly-trunked line finders are busy.

24. In a telephone system, the combination as defined in claim 23, and further including means for preventing the means last-mentioned in claim 23 from becoming effective while said allotter is busy serving a line finder.

25. In a telephone system, a group of line finders divided into a number of subgroups, an allotter of the non-homing type for each of said subgroups, a plurality of secondary finders serving said subgroups in common, a group of numerical switches, the line finders served by each of said allotters including both line finders that are trunked to a corresponding one of said numerical switches directly and line finders that are trunked to a number of said numerical switches by way of said secondary finders, means in each of said allotters operative upon the release of said allotter after serving a call for normally preselecting an idle one of the line finders served by said allotters regardless of their kind of trunking, discriminating means in each of said allotters operable to artificially busy all of said secondary-trunked line finders to said allotter, and traffic controlled means common to said allotters and effective when a predetermined number short of all of said secondary finders are busy for periodically operating the discriminating means of all of said allotters.

26. In a telephone system, a group of lines, a group of primary finders serving said lines, a group of secondary finders serving said primary finders and being divided into a first and second component group, the secondary finders of each component group having access to all the primary finders served by said secondary group, said group of lines and primary finders being divided into a number of subgroups, a corresponding number of primary allotters each for one of said primary subgroups and each being connected with a first and a second secondary allotter, thereby to form an allotter link with said pair of secondary allotters, the first and second secondary allotters of certain of said allotter links serving said first and second component groups respectively and the first and second secondary allotters of the other allotter links serving said second and first component groups respectively, means responsive to the origination of a calling condition in a given subgroup for normally closing a start circuit to the first secondary allotter of the corresponding pair, and transfer means operative when all the secondary finders of the component group served by said first secondary allotter are busy for transferring said start circuit to the second secondary allotter of said allotter link.

27. In a telephone system, a number of groups of line circuits, a corresponding number of groups of primary finders having access to said line circuits, a group of secondary finders each having access to finders of different ones of said primary groups, a primary allotting apparatus for each of said primary groups, a plurality of secondary allotting apparatuses for said secondary group, circuit connections each for individually linking a given one of said primary allotting apparatuses with a given one of said secondary allotting apparatuses, a given one of said primary allotting apparatuses being operative in response to the origination of a call in a line circuit of the corresponding primary group for starting an idle one of said primary finders on a searching operation and causing said primary finder to be marked as calling in said secondary finders, and the secondary allotting apparatus linked to said primary allotting apparatus being operative upon the origination of said call to start an idle one of said secondary finders on a searching operation, and means controlled by said allotting apparatus for preventing said secondary finder in the case of overlapping calls in different primary groups from seizing a calling primary finder that was started by a primary allotting apparatus other than the one linked with the secondary allotting apparatus that started said secondary finder.

28. In a telephone system, a number of groups of line circuits, a corresponding number of groups of primary line finders having access to said line circuits, a group of secondary finders each having a plurality of sets of test bank contacts each set giving access to finders of a different one of said primary groups, a primary allotter for each of said primary groups, a plurality of secondary allotters for said secondary group, circuit connections each individually linking a given one of said primary allotters with a given one of said secondary allotters, each of said primary allotters having means operative in response to the origination of a call in a line circuit of the associated primary group for starting one of said primary finders on a searching operation, causing said primary finder to be marked as calling in the corresponding set of test bank contacts of said secondary finder and causing the secondary allotter linked with said primary allotter to start one of said secondary finders on a searching operation, and means controlled by way of said secondary allotter in accordance with the identity of the starting primary group for confining the last-mentioned searching operation to the set of bank contacts giving access to the primary finder of the last-mentioned group, whereby in the case of overlapping calls in different primary groups a plurality of secondary finders may search simultaneously but a given secondary finder is prevented from seizing a primary finder of a primary group other than the one causing said secondary finder to be started.

29. In a telephone system, a group of finders, an allotter switch for said finders having a number of sets of wipers and contact banks, a corresponding number of said finders being connected to said banks in each position of said switch, each of said wiper and bank sets including a test wiper and test bank respectively, means in each of said finders for applying a guarding potential to the corresponding test bank contact when said finder is in use, said allotter switch also having means operative when each of said test wipers engages a corresponding test bank contact having guarding potential connected thereto for advancing said switch wipers and means operative when one or more of said test wipers engage a test bank contact free of said guarding potential for taking one of the corresponding idle finders into use.

30. In a telephone system, a group of lines divided into a number of subgroups, a group of finders serving said lines and being divided into a plurality of component groups, all the lines of said whole line group being available to all the finders of each of said component groups of finders, allotters for said finders, each subgroup of lines having one allotter for each of said component groups of finders, means responsive to the origination of a call in a given subgroup for normally closing a start circuit for a predetermined one of the allotters of said subgroup, whereby the component group of finders served by said allotter is made first choice to said subgroup, and means operative when all the finders of the last-mentioned component group are busy for transferring said start circuit to another allotter of said subgroup.

31. In a telephone system, a group of lines divided into a plurality of subgroups, a group of finders serving said lines and being divided into a number of component groups, all the lines of said whole line group being available to all the finders of each of said component groups of finders, allotters for said finders, each subgroup of lines having one allotter for each of said component groups of finders, means responsive to the origination of a call in one of said subgroups for normally closing a start circuit for an allotter of said subgroup which serves a predetermined one of said component groups of finders, and means responsive to the origination of a call in another of said subgroups for normally closing a start circuit for an allotter of the last-mentioned subgroup which serves a predetermined other one of said component groups of finders, whereby different component groups of finders are made first choice to said two subgroups, and means operative when all the finders of one of said component groups are busy for transferring the start circuit of the subgroup to which said component group is first choice, to another allotter of said subgroup.

32. In a telephone system, a group of finder means, a group of lines available to said finder means, a plurality of allotter switches serving said finder means, each of said allotter switches having start means, seizure means, wipers and contact banks, said finder means being connected to the banks of said plurality of allotter switches in multiple; said start means being operated upon the initiation of a call on one of said lines for preparing a circuit for said seizure means and for causing said wipers, if then in engagement with bank contacts connected to busy finder means, to be advanced in search of an idle finder means, and said seizure means being operated when said wipers are in engagement with bank contacts connected to an idle finder means for seizing said finder means and busying it against seizure by other allotter switches; and each of said allotter switches also having means operative upon the completion of the finding operation of the last-mentioned finder means for permitting both said start means and said seizure means to restore and for causing said wipers subsequently to be advanced to the next following position, whereby the finder means connected to the bank contacts in the last-mentioned position are tentatively selected without being seized and regardless of whether the wipers of another allotter switch are already in engagement with its corresponding bank contacts.

References Cited in the file of this patent

UNITED STATES PATENTS 2,077,861 Taylor et al. ------------ Apr. 30, 1937